US012666339B2

(12) United States Patent
Guo et al.

(10) Patent No.: US 12,666,339 B2
(45) Date of Patent: Jun. 23, 2026

(54) LEARNING BASED ROUTING LINK SCHEDULING IN HETEROGENEOUS WIRELESS IoT NETWORKS

(71) Applicant: Mitsubishi Electric Research Laboratories, Inc., Cambridge, MA (US)

(72) Inventors: Jianlin Guo, Cambridge, MA (US); Zhiyang Wang, Philadelphia, PA (US); Kieran Parsons, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 306 days.

(21) Appl. No.: 18/614,881

(22) Filed: Mar. 25, 2024

(65) Prior Publication Data

US 2025/0301393 A1    Sep. 25, 2025

(51) Int. Cl.
H04W 40/24        (2009.01)
G06N 3/088        (2023.01)

(52) U.S. Cl.
CPC .......... H04W 40/248 (2013.01); G06N 3/088 (2013.01); H04W 40/246 (2013.01)

(58) Field of Classification Search
CPC . H04W 40/248; H04W 40/246; H04W 40/24; H04W 84/18; H04W 28/021; G06N 3/088; G06N 3/045; G06N 3/08; G06N 20/00
See application file for complete search history.

(56) References Cited

U.S. PATENT DOCUMENTS

2019/0141708 A1*  5/2019  Chen ........................ H04L 41/12
2021/0306910 A1*  9/2021  Guo ................. H04W 28/0908
2022/0385567 A1* 12/2022  Zhang ..................... H04L 45/24

* cited by examiner

*Primary Examiner* — Ricky Q Ngo
*Assistant Examiner* — Kabir U Jahangir
(74) *Attorney, Agent, or Firm* — Gene Vinokur

(57)        ABSTRACT

A heterogeneous multi-hop wireless network is provided. The network consists of single-link data nodes, multi-link data nodes and data centers. The single-link data node supports one communication interface, the multi-link data node supports two communication interfaces and the data center is considered as multi-link node. The routes from all data nodes to data centers are given. The network is configured to schedule data transmissions from all data nodes to data centers without transmission interference and channel access delay. The routing link scheduling problem is formulated as an optimization problem with constraints. Due to the NP-Hard complexity of the formulated optimization problem, the scheduling policies are then parameterized for the application of graph neural network techniques. The parameterized optimization problem is solved using primal-dual approach with zero duality gap. A heterogeneous graph neural network (HetGNN) algorithm is provided to train the primal-dual problems.

22 Claims, 17 Drawing Sheets

Data center

Multi-link node

Single-link node

Low rate routing link

High rate routing link

Algorithm 1 Primal-Dual Unsupervised Training Algorithm

1: Input 1: Node set $\mathcal{V} = \mathcal{S} + \mathcal{M}$
2: Input 2: Network topology
3: Input 3: Route set $\mathcal{R}$
4: Discover neighbor set for each node
5: Configure routing link set $\mathcal{L}$
6: Construct interference links for each routing link
7: for $t \in \mathbb{Z}$ do
8:     Update node features
9:     Update edge features
10:     Embed all the routes (metapaths) and generate current scheduling policy $\Psi(\mathbf{W}(t))$
11:     Observe total data amount collected by the data centers
12:     Update primal and dual variables $$\mathbf{W}(t+1) = \mathbf{W}(t) + \epsilon_t \nabla_{\mathbf{W}} \Psi(\mathbf{W})(A_{\mathcal{V}}^{\mathsf{T}} x + A_{\mathcal{I}}^{\mathsf{T}} A_{\mathcal{S}} \lambda(t))$$

$$\mu_s(t+1) = [\mu_s(t) - \epsilon_t \Psi_s(\mathbf{W}(t))(x_z - \mathbb{E}_H[C_z])]^+$$

$$\lambda(t+1) = [\lambda(t) - \epsilon_t (A_{\mathcal{S}} A_{\mathcal{I}} \Psi(\mathbf{W}(t)) - 1_{|s|})]^+$$

13: end for

Fig. 9

LEARNING BASED ROUTING LINK SCHEDULING IN HETEROGENEOUS WIRELESS IoT NETWORKS

FIELD OF THE INVENTION

This invention relates generally to routing data in wireless communication networks, and particularly to routing scheduling in heterogeneous wireless communication networks.

BACKGROUND OF THE INVENTION

With the advent of 5G and beyond communication technologies, consumer IoT devices are evolving from the current-generation to the next-generation. The current-generation IoT devices are equipped with fewer resources and perform simple functions. On the other hand, the next-generation IoT devices are installed with more resources and can perform more functions. Take smart meters for example, current-generation meters support one communication interface such as Wi-Fi (IEEE 802.11) or Wi-SUN (IEEE 802.15.4) and collect metering data only. On the other hand, next-generation meters can support multiple communication interfaces, such as both Wi-Fi/Wi-SUN and 5G, collect metering data and sense power supply information, which is critical for smart grid maintenance and must be reliably delivered to data center. However, it is impractical to completely remove the deployed current-generation devices during the migration phase. Accordingly, next-generation IoT networks will consist of mixed current-generation and next-generation devices. Customers expect more from next-generation IoT networks. Therefore, new network technologies need to be developed for next-generation IoT networks to meet consumers' expectations.

IoT networks are typically multi-hop. As a result, routing is inevitable. Routing consists of route discovery and route scheduling. Both route discovery and route scheduling are high-complexity problems. The route discovery can be NP-complete, e.g., maximizing throughput in a multi-hop wireless network is proved to be NP-hard as a result of wireless interference. It has also been proved that both centralized and distributed route scheduling problems are NP-complete in 2D mesh topology.

Route discovery is well studied. There are well known route discovery protocols including Dijkstra's shortest path algorithm, dynamic source routing (DSR), ad-hoc on-demand distance vector (AODV) and the IPv6 Routing Protocol for Low-Power and Lossy Networks (RPL).

Route scheduling is more complex than route discovery, especially in carrier sense multiple access (CSMA) based multi-hop wireless IoT networks, where wireless interference presents great challenges. Route discovery may not consider wireless interference. However, route scheduling must consider wireless interference. Compared with route discovery, route scheduling is less studied. Route scheduling in wireless networks is to schedule channel access for data transmission to avoid mutual transmission interference and channel access delay, thus improving network efficiency.

Besides wireless interference, the emerging heterogeneous IoT networks add extra complexity to routing problems. The heterogeneity such as device heterogeneity, data heterogeneity and communication capability heterogeneity must be considered for next-generation IoT network technology development since more capable devices can play an important role to improve network performance, e.g., the devices with multiple communication interfaces can significantly improve IoT network performance. However, most existing routing technologies are designed for current-generation homogeneous networks without considering network heterogeneity.

Accordingly, it is desirable to provide new routing technologies to efficiently deliver data in heterogeneous wireless IoT networks.

To that end, the present invention presents a machine learning based routing link scheduling scheme for heterogeneous wireless IoT networks. The routing link scheduling problem is formulated as an optimization problem, which is then parameterized for application of machine learning algorithm and the parameterized problem is solved using primal-dual approach with zero duality gap.

SUMMARY OF THE INVENTION

Some embodiments of the invention are based on recognition that the consumer wireless devices are evolving from the current-generation to the next-generation, wherein the current-generation devices support single communication interface and perform simple function and are therefore referred as to the single-link nodes, wherein the next-generation devices can support multiple communication interfaces and perform more functions and are thus referred as to multi-link nodes.

Some embodiments of the invention are based on recognition that during the consumer device migration phase, it is impractical to completely replace the deployed current-generation devices with the next-generation devices due to cost consideration and service continuation. As a result, next-generation wireless networks will consist of mixed current-generation and next-generation nodes.

To that end, one object of various embodiments of the invention is to form the next-generation wireless IoT networks using data centers, the mixed current-generation data nodes and next-generation data nodes, wherein the data centers are considered as multi-link nodes.

Some embodiments of the invention are based on recognition that the wireless IoT networks are typically multi-hop networks, in which at least one data node cannot directly communicate with any data center and the communication needs to be relayed by other data nodes. Accordingly, the routing is inevitable.

Some embodiments of the invention are based on recognition that the routing consists of route discovery and route scheduling, wherein route scheduling is more complex than route discovery, especially in carrier sense multiple access (CSMA) based wireless networks, where wireless interference presents great challenges since interfering routing links cannot transmit simultaneously.

To that end, some embodiments of invention provide a method to determine the wireless interference of routing links in shared medium wireless communication networks to avoid scheduling interfering routing links at same time.

Some embodiments of the invention are based on recognition that route scheduling in multi-hop wireless networks can be divided into two categories: whole route scheduling and routing link scheduling, wherein in whole route scheduling, the non-interfering routes can be scheduled to transmit simultaneously, wherein in routing link scheduling, the non-interfering routing links can be scheduled to transmit simultaneously. However, whole route scheduling is less efficient than routing link scheduling since multiple links on different routes or on same route can be scheduled to transmit simultaneously.

Accordingly, various embodiments of the invention provide routing link scheduling techniques for next-generation heterogeneous wireless networks, wherein the routing links among single-link nodes, referred to as low-speed links, may interfere with each other and the routing links among multi-link nodes, referred to as high-speed links, do not interfere with each other.

Some embodiments of the invention are based on recognition that route scheduling in wireless network is a spectrum resource allocation problem and aims to schedule channel access for data transmission to avoid mutual transmission interference and channel access delay, thus improving network efficiency.

To that end, various embodiments of the invention formulates routing link scheduling problem in heterogeneous multi-hop wireless IoT networks as an optimization problem to maximize network throughput subject to (1) interference constraint such that the scheduled routing links among single-link nodes do not interfere with each other, (2) link capacity constraint such that the amount of data scheduled for a routing link does not exceed the link capacity, (3) scheduling decision constraint such that a routing link is either scheduled or not scheduled and (4) data availability constraint such that a routing link is scheduled only if the starting node of the link has data to transmit.

Some embodiments of the invention are based on recognition that optimal link scheduling involves solving a maximum weighted independent set problem, which is known to be NP-hard. No efficient global optimal algorithm is available yet for routing link scheduling in device-to-device networks, especially for a densely deployed network with a large number of mutually interfering links.

To that end, some embodiments of the invention provide the machine learning based routing link scheduling techniques for data transmission in heterogeneous multi-hop wireless IoT networks, wherein the machine learning based routing methods can outperform traditional routing methods in complex network environments such as heterogeneous wireless IoT networks.

Accordingly, various embodiments of the invention parameterize the scheduling policies in formulated routing link optimization problem for applying machine learning techniques, wherein the parameterized optimization problem is solved using the primal-dual approach, wherein the formulated primal-dual problems are proved to have zero duality gap.

To that end, a heterogeneous graph neural network (HetGNN) algorithm is provided to train the primal-dual problems.

According to some embodiments of the present invention, a data center is provided for performing a routing link scheduling for heterogeneous wireless networks including single-link data nodes, multi-link data nodes, and at least another data center, including: at least one transceiver configured to perform data communications with the single-link data nodes, the multi-link data nodes; a processor; and a memory comprising instructions stored thereon, that when executed on the processor, perform the steps of: providing a total data node set including a single-link data node set and a multi-link data node set, a network topology of the heterogeneous wireless networks, and a route set from the total node set to the at least one data center, wherein the network topology indicates a number of data centers and locations of data nodes and data centers; formulating a routing link scheduling problem to determine routing link scheduling policies as a combinatorial optimization problem subject to a set of constraints; parameterizing the routing link scheduling policies by a mapping function associated with a parameter set to convert the combinatorial optimization problem to a parameterized optimization problem; solving the parametrized optimization problem using a primal-dual method with zero duality gap; and updating primal-dual variables based on an unsupervised heterogeneous graph neural network (HetGNN) algorithm, wherein the steps of training the node features and edge features through updating the primal-dual variables continue until a time threshold; and generating the routing link scheduling policies at each step up to the time threshold for the single-link data nodes and the multi-link data nodes, respectively, based on the updated primal dual variables, wherein each of the routing link scheduling policies includes a data transmission time for a scheduled routing link such that the scheduled routing links are not interfering links.

a) Further, some embodiments of the present invention provide a routing link scheduling method for heterogeneous wireless networks including single-link data nodes, multi-link data nodes and at least one data center having at least one transceiver, a processor in association with a memory storing computer programs, wherein the at least one data center is configured to perform steps. The steps may include providing a total data node set including a single-link data node set and a multi-link data node set, a network topology of the heterogeneous wireless networks, and a route set from the total node set to the at least one data center, wherein the network topology indicates a number of data centers and locations of data nodes and data centers; formulating a routing link scheduling problem to determine routing link scheduling policies as a combinatorial optimization problem subject to a set of constraints; parameterizing the routing link scheduling policies by a mapping function associated with a parameter set to convert the combinatorial optimization problem to a parameterized optimization problem; solving the parameterized optimization problem using a primal-dual method with zero duality gap; and updating primal-dual variables based on an unsupervised heterogeneous graph neural network (HetGNN) algorithm, wherein the steps of training the node features and edge features through updating the primal-dual variables continue until a time threshold; and generating the routing link scheduling policies at each step up to the time threshold for the single-link data nodes and the multi-link data nodes, respectively, based on the updated primal dual variables, wherein each of the routing link scheduling policies includes a data transmission time for a scheduled routing link such that the scheduled routing links are not interfering links.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9 depicts the provided heterogeneous graph neural network (HetGNN) routing link scheduling algorithm in heterogeneous multi-hop wireless IoT networks, according to some embodiments of the present invention;

Figure 1:
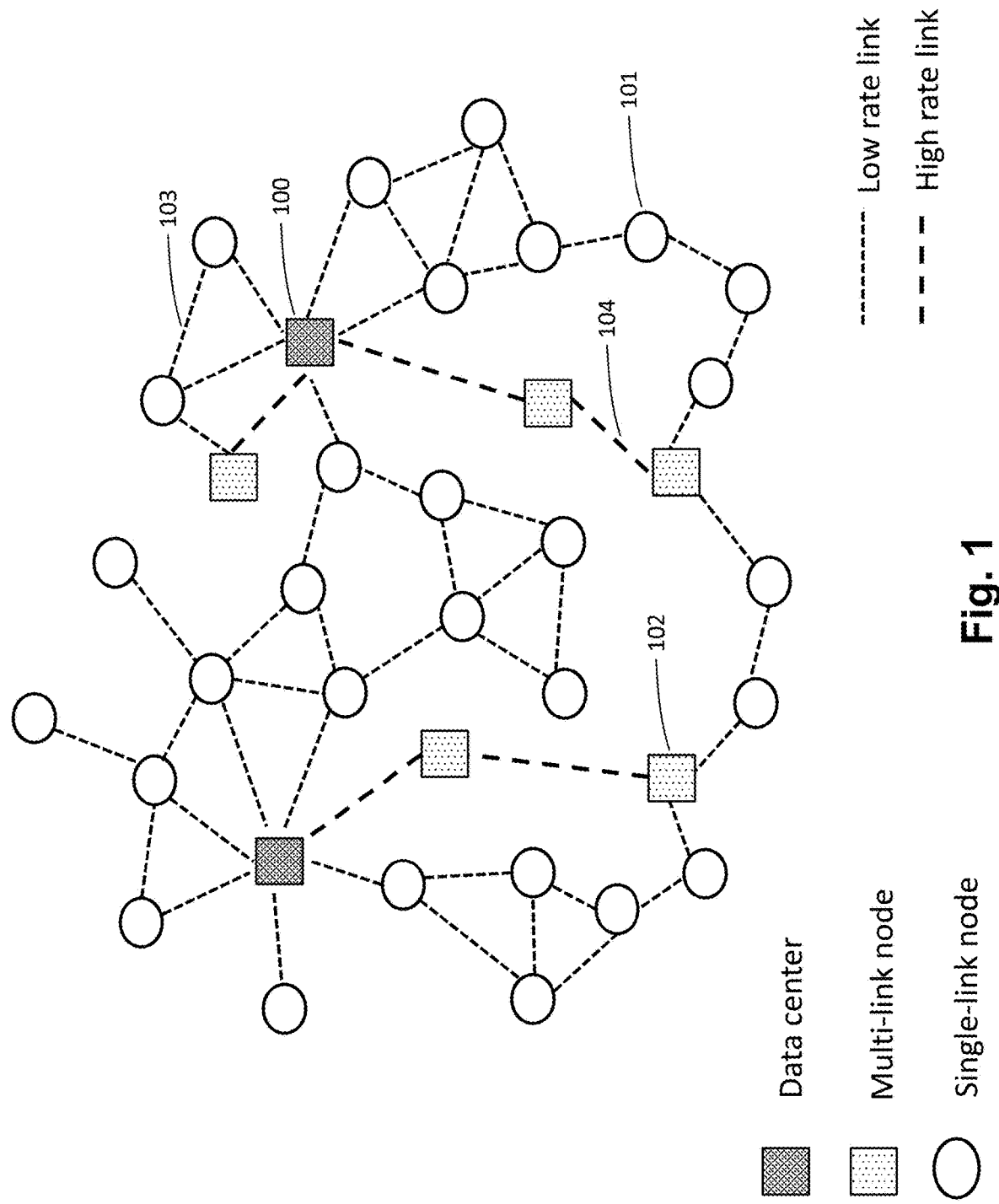
FIG. 1 is a schematic illustrating a heterogeneous multi-hop wireless IoT network consisting of data centers and the mixed single-link data nodes and multi-link data nodes, according to some embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

With the advent of 5G and beyond communication technologies, consumer IoT devices are evolving from the current-generation to the next-generation. The current-generation IoT devices are equipped with fewer resources and perform simple functions. On the other hand, the next-generation IoT devices are installed with more resources and can perform more functions. Take smart meters for example, current-generation meters support one communication interface such as Wi-Fi (IEEE 802.11) or Wi-SUN (IEEE 802.15.4) and collect metering data only. On the other hand, next-generation meters can support multiple communication interfaces, such as both Wi-Fi/Wi-SUN and 5G, collect metering data and sense power supply information, which is critical for smart grid maintenance and must be reliably delivered to data center. However, it is impractical to completely remove the deployed current-generation devices during the migration phase. Accordingly, next-generation IoT networks will consist of mixed current-generation and next-generation devices. Customers expect more from next-generation IoT networks. Therefore, new network technologies need to be developed for next-generation IoT networks to meet consumers' expectations.

IoT networks are typically multi-hop. As a result, routing is inevitable. Routing consists of route discovery and route scheduling. Both route discovery and route scheduling are high-complexity problems. The route discovery can be NP-complete, e.g., maximizing throughput in a multi-hop wireless network is proved to be NP-hard as a result of wireless interference. It has also been proved that both centralized and distributed route scheduling problems are NP-complete in 2D mesh topology.

Route scheduling is more complex than route discovery, especially in carrier sense multiple access (CSMA) based multi-hop wireless IoT networks, where wireless interference presents great challenges. Compared with route discovery, route scheduling is less studied. Route scheduling in wireless networks is to schedule channel access for data transmission to avoid mutual transmission interference and channel access delay, thus improving network efficiency. For example, the time synchronized channel hopping (TSCH) is a scheduling mechanism provided in IEEE 802.15.4 standard. However, the conventional routing scheduling mechanisms such as TSCH require clock synchronization, which is difficult to realize in wireless IoT networks especially in multi-hop IoT networks. Recently, machine learning based routing techniques have been proposed and can outperform traditional routing methods in complex network environments, which makes machine learning based routing techniques the promising approaches for next-generation IoT networks.

In addition, the emerging heterogeneous IoT networks add extra complexity to routing problems. The heterogeneity such as device heterogeneity, data heterogeneity and communication capability heterogeneity must be considered for next-generation IoT network technology development since more capable devices can play an important role to improve network performance, e.g., the devices with multiple communication interfaces can significantly improve IoT network performance. However, most existing routing technologies are designed for current-generation homogeneous networks without considering network heterogeneity.

Therefore, the present invention focuses on route scheduling in multi-hop heterogeneous wireless IoT networks. A machine learning based routing link scheduling scheme is provided by formulating the routing link scheduling problem as an optimization problem, which is then parameterized for applying graph neural network techniques. The parameterized problem is solved using the primal-dual approach with a zero-duality gap.

FIG. 1 is a schematic illustrating a heterogeneous wireless IoT network consisting of data centers 100, single-link data nodes 101, multi-link data nodes 102. The nodes form a multi-hop mesh network, where the general flow of data packets is from the data nodes (single-link nodes or multi-link nodes) to data centers 100, although control messages can be sent in either direction. At least one data node cannot directly communicate with any data center 100 and therefore, the communication needs to be relayed by intermediate nodes. A single-link node supports a low-speed communication interface such as IEEE 802.15.4. However, a multi-link node supports both a low-speed communication interface and a high-speed communication interface such as 5G. The data centers are considered as multi-link nodes. As a result, a low-speed link 103 is formed by two single-link nodes or by a single-link node and a multi-link node. On the other hand, a high-speed link 104 can only be formed by two multi-link nodes.

To deliver data in multi-hop IoT networks, routing is inevitable. The routing problem is a high complexity problem consisting of two procedures: route discovery and routing scheduling. The route discovery can be NP-complete, e.g., maximizing throughput in multi-hop wireless network is proved to be NP-hard as a result of the wireless interference. It has been also proved that both centralized and distributed routing schedule problems are NP-complete in 2D Mesh topology.

Figure 2:
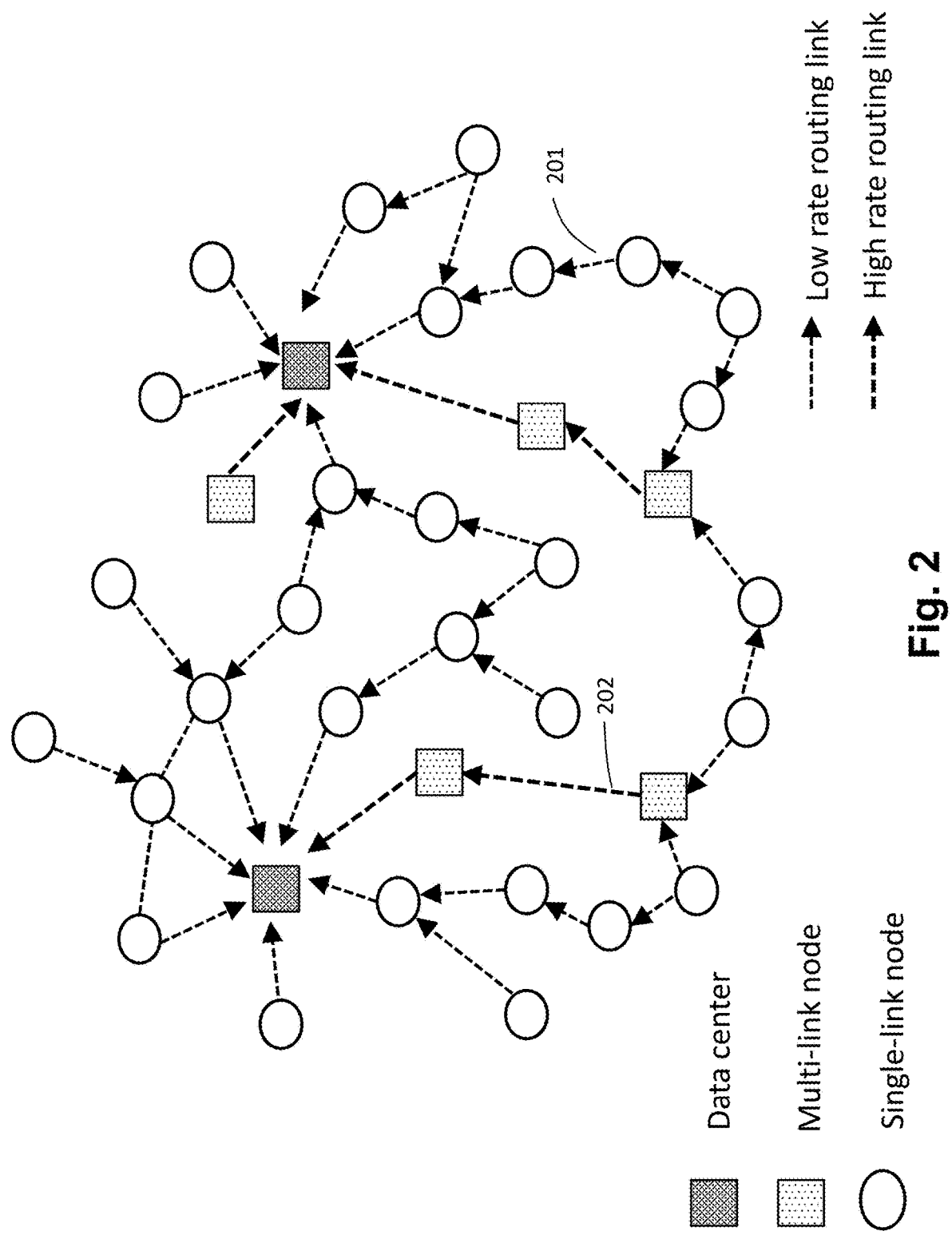
FIG. 2 shows example routes from all data nodes to data centers for the network topology illustrated in FIG. 1, according to some embodiments of the present invention.

FIG. 2 shows example routes discovered for the network shown in FIG. 1, wherein a routing link can be a low-speed link 201 or a high-speed link 202. A routing link is directional. There are well known route discovery protocols including Dijkstra's shortest path algorithm, dynamic source routing (DSR), ad-hoc on-demand distance vector (AODV) and the IPv6 Routing Protocol for Low-Power and Lossy Networks (RPL). However, these routing protocols are not designed to handle heterogenous networks, e.g., RPL sends all uplink traffic to default parent and use same network configuration parameters for all nodes. Accordingly, it is necessary to address challenges arising in heterogeneous IoT networks. The objective of the present invention is route scheduling, i.e., to schedule efficient data transmission to avoid mutual transmission interference and channel access delay.

Route scheduling is a spectrum resource allocation problem. It aims to schedule data transmission by avoiding transmission interference and channel access delay. Efficient scheduling of transmissions is a key problem in wireless networks. The main challenge stems from the fact that optimal link scheduling involves solving a maximum weighted independent set problem, which is known to be NP-hard. No efficient global optimal algorithm is available yet for routing link scheduling in device-to-device networks, especially for a densely deployed network with a large number of mutually interfering links.

Route scheduling is typically formulated as an optimization problem solved by protocol based methods or mathematical optimization approaches. However, as IoT devices become more and more diverse, IoT networks become more complex. As a result, the routing problem becomes more and more complicated for traditional protocols and mathematical optimization approaches to provide optimal solutions. Machine learning based routing techniques have been recently proposed and can outperform traditional routing methods in complex network environments.

System Model and Problem Formulation

FIG. 1 illustrates the heterogeneous multi-hop wireless IoT network system model with symmetric communication connectivity, where the edge is directionless. However, a routing link is directional as shown in FIG. 2. The present invention considers a heterogeneous wireless IoT network consisting of a single-link data node set S, a multi-link data node set $\mathcal{M}$ and data center set C as shown in FIG. 1, where some edges are used in data routing and others are not involved in routing. Single-link data nodes support one communication interface, multi-link data nodes support multiple communication interfaces and data centers are considered as multi-link nodes. A single-link data node can communicate with neighboring single-link nodes, multi-link nodes and data centers using a low-speed communication interface. On the other hand, a multi-link data node can communicate with neighboring single-link data nodes using the same low-speed communication interface and with neighboring multi-link data nodes and data centers using a high-speed communication interface.

The total data node set is $V=S\cup\mathcal{M}$ indexed with $k=\{1, 2, \ldots, |S|, |S|+1, \ldots, |S|+|\mathcal{M}|\}$, where S is the single-link data node set and $\mathcal{M}$ is the multi-link data node set. The data sets for data nodes are denoted as $x=\{x_1, x_2, \ldots x_{|S|+1}, \ldots, x_{|S|+|\mathcal{M}|}\}$, where the data of a data node include self data and potential relay data in the routing process. The edge set is denoted as $\varepsilon \subset (V\cup C)\times(V\cup C)$ with $\varepsilon=\varepsilon_1\cup\varepsilon_2$, where $\varepsilon_2$ contains the edges between nodes belonging to multi-link set $\mathcal{M}$ and data center set C, and $\varepsilon_1$ represents the rest of the edges.

The network topology and routes from all data nodes to data centers are given as illustrated in FIG. 1 and FIG. 2. The route set is denoted as $\mathcal{R}=\{R_1, R_2, \ldots, R_{NoR}\}$ with each route containing a sequence of ordered nodes, i.e., routing links, where NoR is the number of routes and $NoR\geq|S|+|M|$ since a data node may have multiple routes. A routing link on a route is a directional edge, i.e., an edge with a starting node and an ending node. Accordingly, the routing links are divided into $\varepsilon_1$ links and $\varepsilon_2$ links. Without loss of generality, $\varepsilon_2$ links are long range communication links such as 5G links and $\varepsilon_1$ links are short range communication links such as Wi-Fi/Wi-SUN links. A route can consist of $\varepsilon_1$ links only or $\varepsilon_2$ links only or both $\varepsilon_1$ and $\varepsilon_2$ links.

Figures 3A, 3B, 3C:
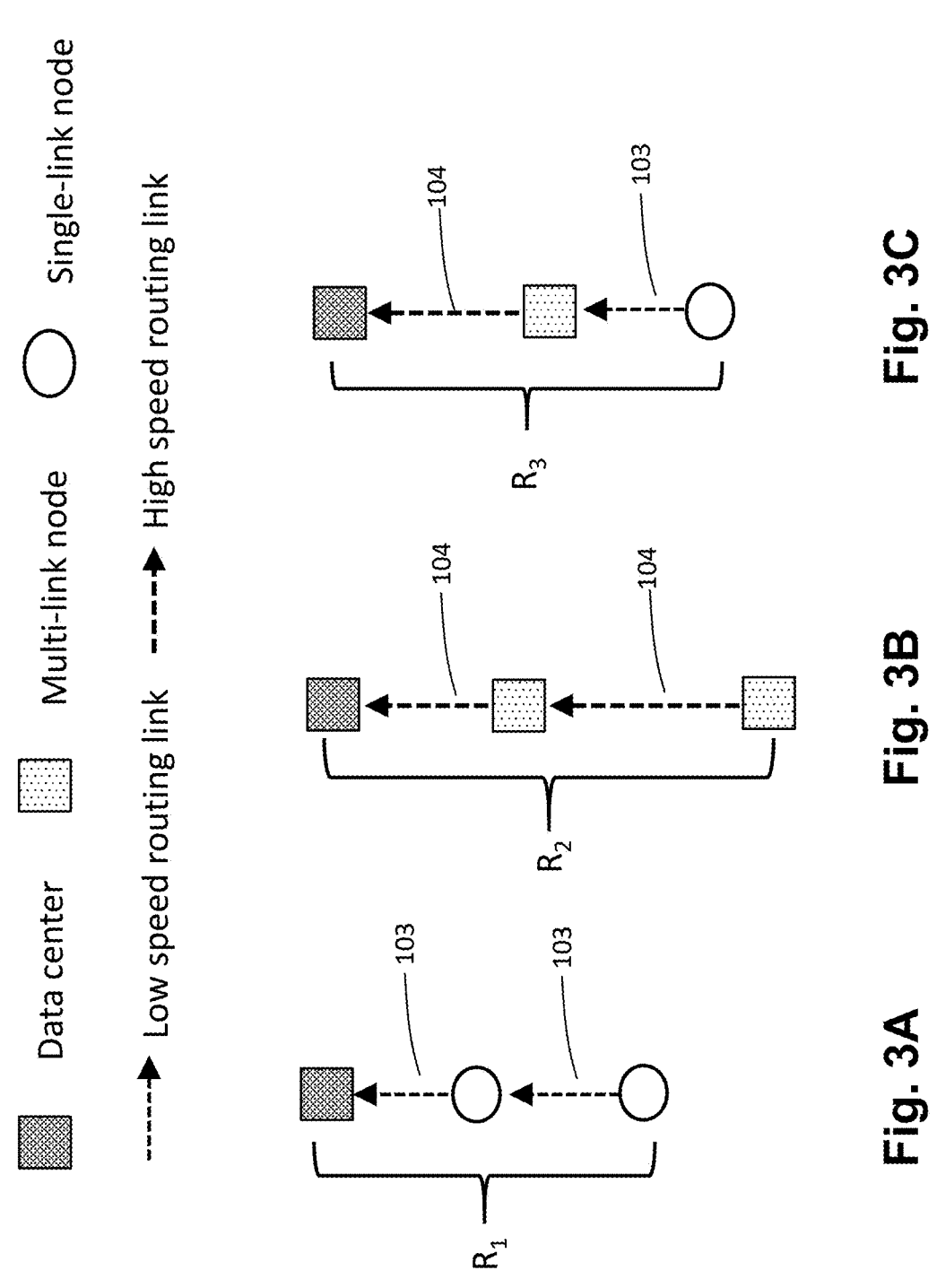
FIG. 3A shows an example of route $R_1$ consisting of low-speed links 103 only, according to some embodiments of the present invention.
FIG. 3B shows an example of route $R_2$ consisting of high-speed links 104 only, according to some embodiments of the present invention.
FIG. 3C shows an example of route $R_3$ consisting of both low-speed link 103 and high-speed link 104, according to some embodiments of the present invention.

FIG. 3A shows an example of route $R_1$ consisting of $\varepsilon_1$ links 103 only, FIG. 3B shows an example of route $R_2$ consisting of $\varepsilon_2$ links 104 only, and FIG. 3C shows an example of route $R_3$ consisting of both $\varepsilon_1$ link 103 and $\varepsilon_2$ link 104.

In shared medium wireless communications such as Wi-Fi and Wi-SUN, the interfering links are the links that cause wireless signal collision at the at least one recipient if these links transmit simultaneously. In other words, a set of routing links are interfering links if their transmissions can cause mutual interference. There can be different methods to determine routing link interference. The present invention provides following method to determine routing link interference: a set of routing links $L_1 \triangleq a_1 \rightarrow b_1$, $L_2 \triangleq a_2 \rightarrow$ $b_2, \ldots, L_n \triangleq a_n \rightarrow b_n$ are interfering links if and only if there exists at least one $b_j$ such that $b_j$ is a neighbor of at least two $a_i$s. There are different ways a node can discover its neighbors, e.g., via probe and response mechanism.

Without loss of generality, assume that $\varepsilon_2$ links such as 5G links do not interfere with each other and $\varepsilon_1$ links such as Wi-Fi/Wi-SUN links can however interfere with each other. In addition, $\varepsilon_1$ links do not interfere with $\varepsilon_2$ links. For two $\varepsilon_1$ links $L_i$ and $L_j$, notation $L_i \cap L_j = \emptyset$ is used to indicate interference free, i.e., non-interfering.

Figure 4A:
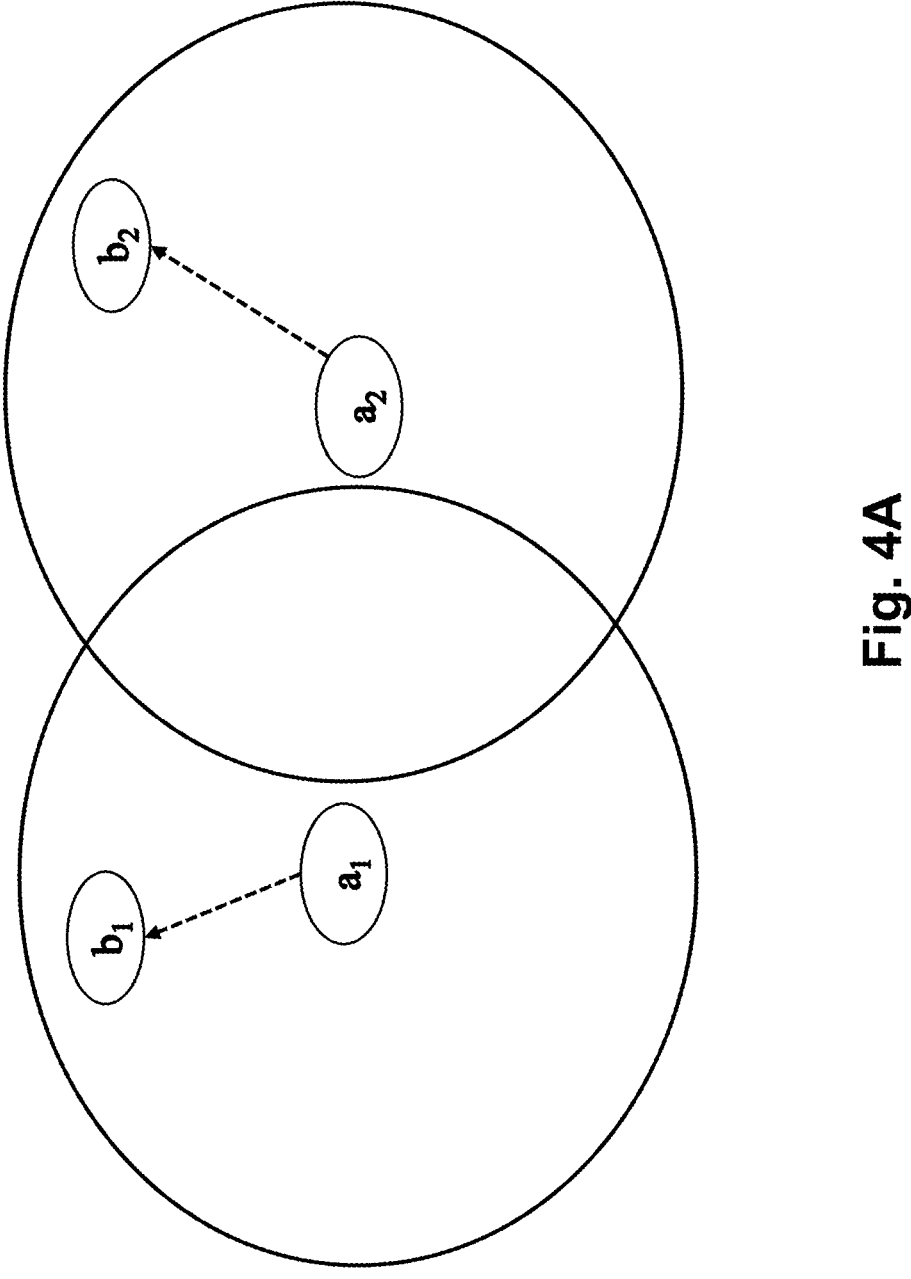
FIG. 4A illustrates an example of non-interfering routing links, according to some embodiments of the present invention.
Figure 4B:
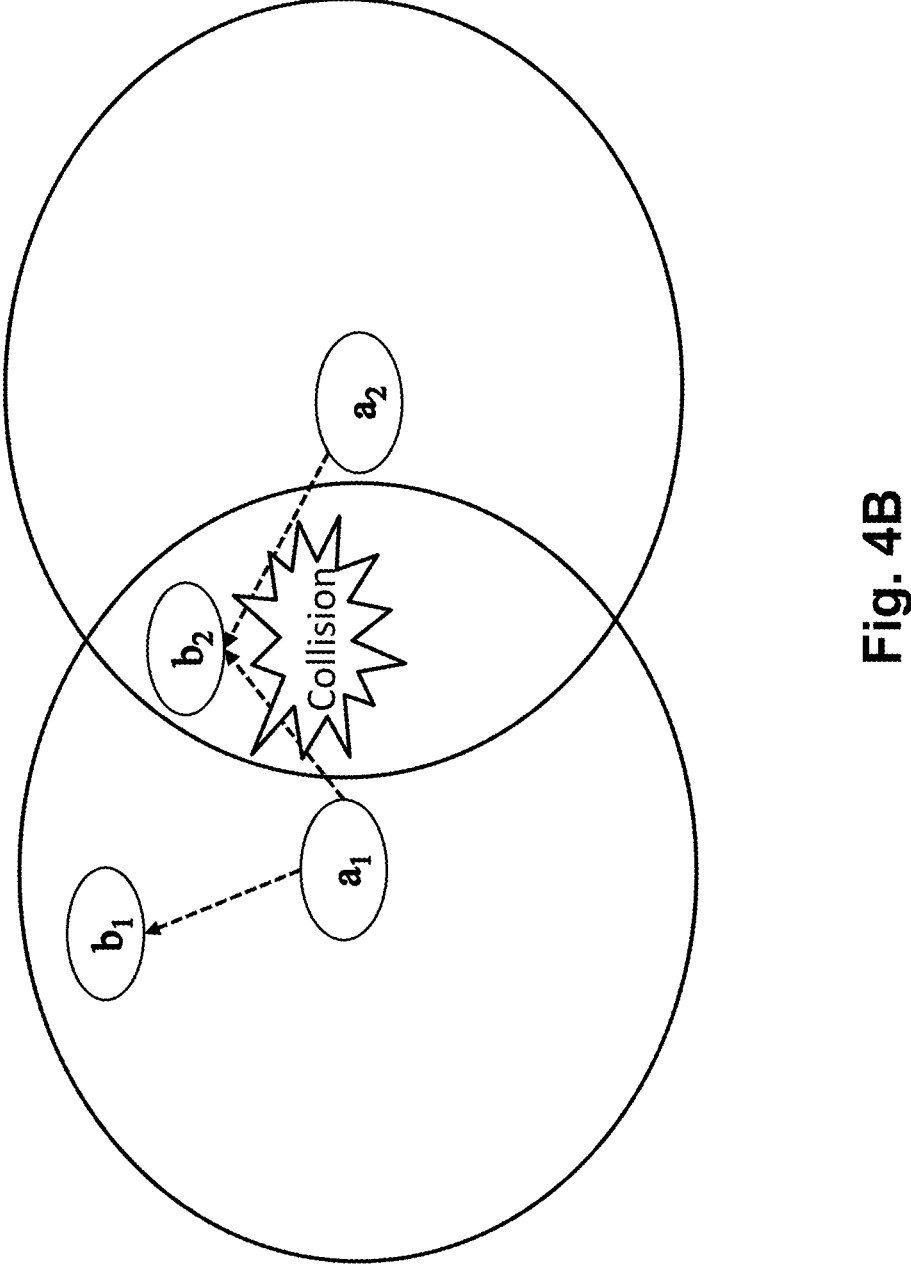
FIGS. 4B, 4C and 4D illustrates an example of interfering routing links, according to some embodiments of the present invention.
Figure 4C:
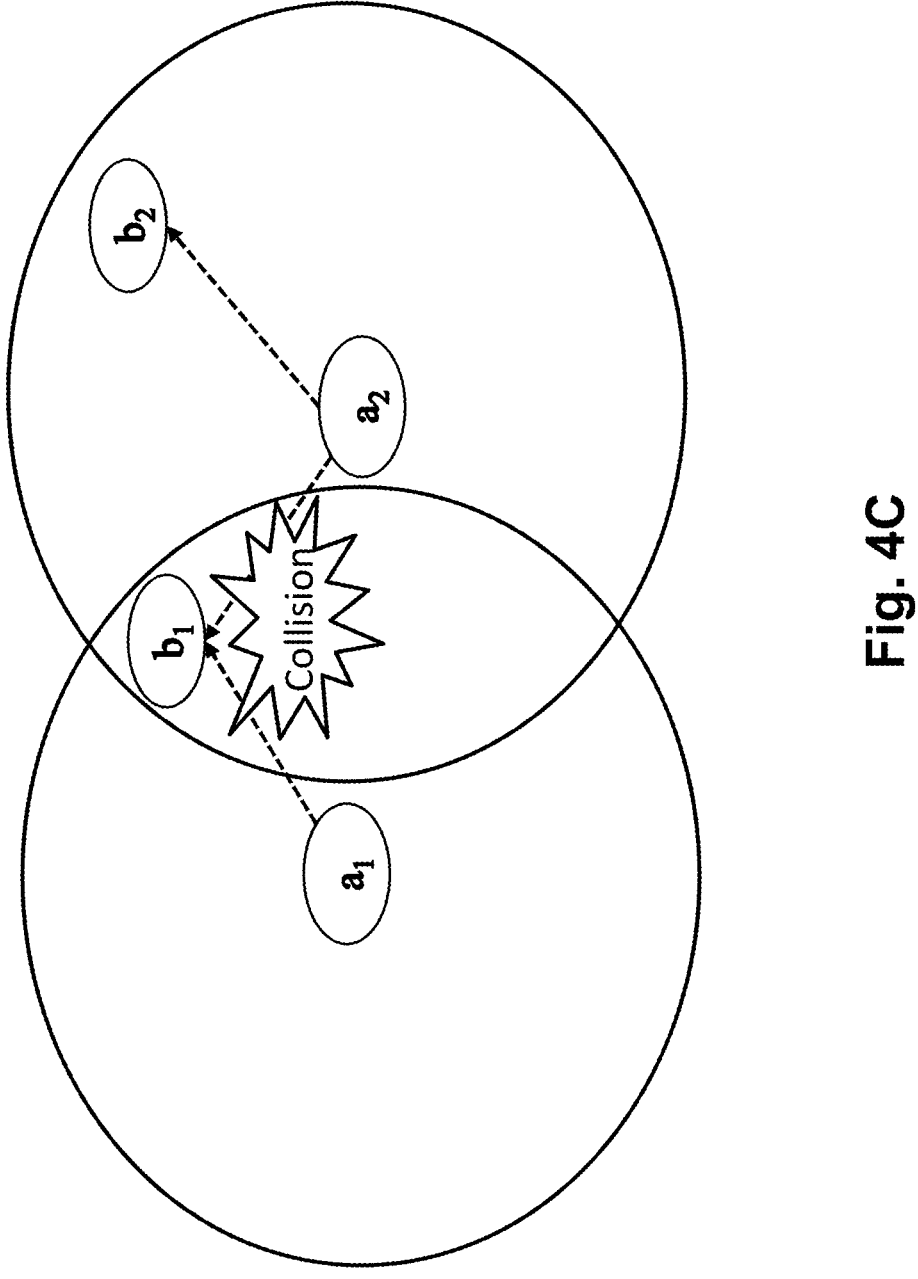
Figure 4D:
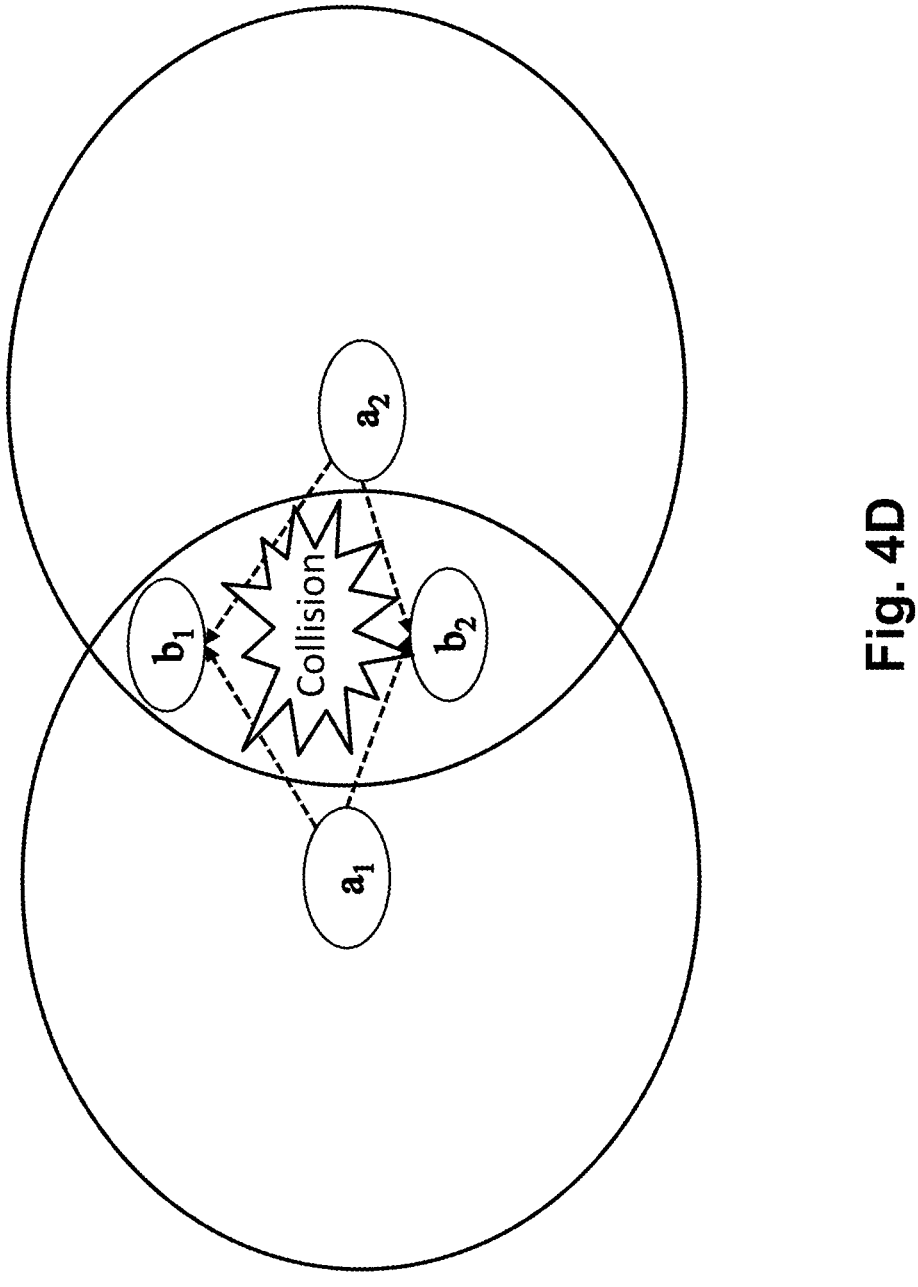

FIG. 4A shows an example of two links $a_1 \rightarrow b_1$ and $a_2 \rightarrow b_2$ that do not interfere with each other. FIG. 4B shows an example of two links $a_1 \rightarrow b_1$ and $a_2 \rightarrow b_2$ in which link $a_1 \rightarrow b_1$ interfere with link $a_2 \rightarrow b_2$ since node $b_2$ is neighbor of both $a_1$ and $a_2$. As a result, transmission of $a_1$ collides with transmission of $a_2$ at $b_2$. FIG. 4C shows another example of two links $a_1 \rightarrow b_1$ and $a_2 \rightarrow b_2$ in which link $a_2 \rightarrow b_2$ interfere with link $a_1 \rightarrow b_1$ since node by is neighbor of both $a_1$ and $a_2$. As a result, transmission of a collides with transmission of $a_2$ at $b_1$. FIG. 4D shows an example of two links $a_1 \rightarrow b_1$ and $a_2 \rightarrow b_2$ in which two links interfere with each other since both b and $b_2$ are neighbors of both $a_1$ and $a_2$.

The objective of routing link scheduling is to schedule routing links for efficient data transmission to avoid transmission collision and random backoff delay incurred by the CSMA mechanism used in Wi-Fi/Wi-SUN channel access mechanisms.

The route scheduling in shared medium wireless networks can be divided into two categories: whole route scheduling and routing link scheduling. In whole route scheduling, the non-interfering routes can be scheduled to transmit simultaneously. In routing link scheduling, the non-interfering links can be scheduled to transmit simultaneously. However, whole route scheduling is less efficient than routing link scheduling, especially in data centric networks, where all routes have one of the data centers as the destination node, as a result, the routes that could be scheduled to transmit simultaneously are the routes heading towards different data centers. On the other hand, it is possible that multiple links on different routes or on same route can be scheduled to transmit simultaneously without causing interference. Therefore, the present invention provides routing link scheduling technologies.

Figures 5A, 5B:
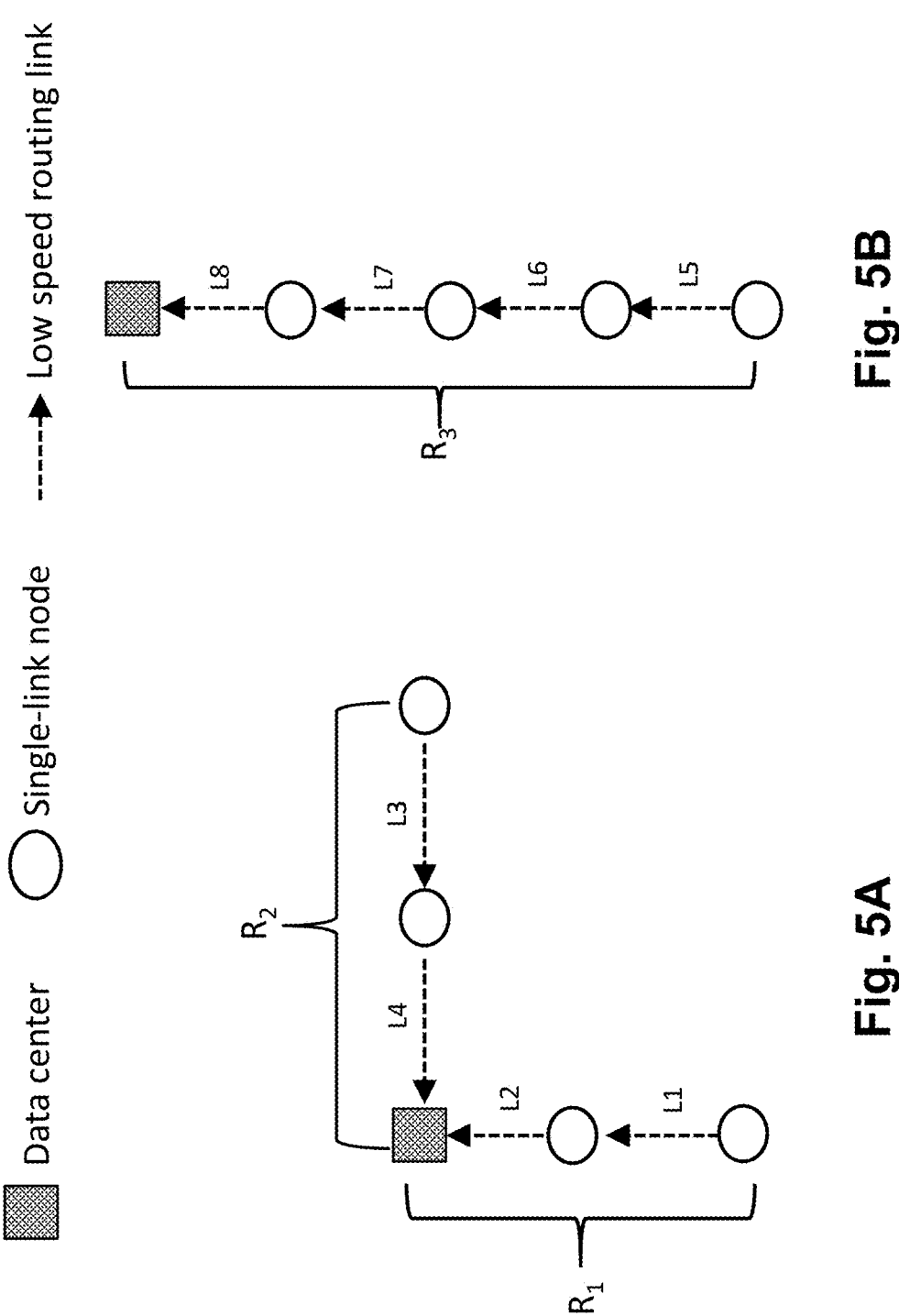
FIG. 5A shows an example of two routes $R_1$ and $R_2$ that cannot be scheduled to transmit simultaneously, according to some embodiments of the present invention.
FIG. 5B shows an example of route for which multiple links can be scheduled to transmit simultaneously, according to some embodiments of the present invention.

FIG. 5A is an example to demonstrate the inefficiency of whole route scheduling, where route $R_1$ and route $R_2$ interfere with each other since these two routes contain two interfering links L2 and L4 due to the share of data center node. Accordingly, these two routes cannot be scheduled to transmit simultaneously. However, there are routing links on these two routes that can be scheduled to transmit simultaneously, e.g., links L1 and L3 can transmit simultaneously without causing any interference. Assume a packet transmission takes one time slot (data transmission time). The whole route scheduling takes four time slots to deliver two packets to data center. However, routing link scheduling takes three time slots. In fact, it is possible that multiple routing links on the same route can transmit simultaneously without causing any interference. In FIG. 5B, routing links L5 and L8 of route $R_3$ can transmit simultaneously without causing any interference. This indicates that routing link scheduling is more efficient than whole route scheduling.

Furthermore, routing link scheduling is more efficient than the CSMA based method in shared medium communication network. To show the inefficiency of CSMA mechanism in CSMA based wireless network and the necessity of routing link scheduling, IEEE 802.15.4 protocol is used as example of shared medium communication technology to illustrate transmission interference and channel access delay.

Figure 6:
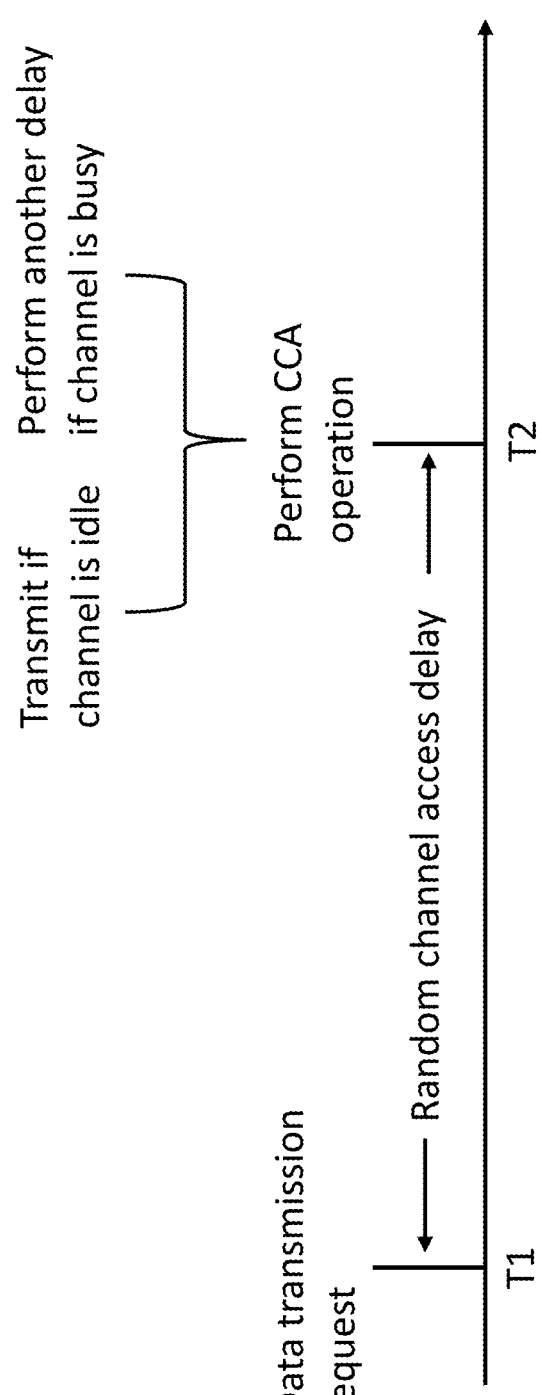
FIG. 6 depicts random channel access process of the CSMA based channel access mechanism.

To transmit data in CSMA mode, an IEEE 802.15.4 device first performs random backoff delay no matter channel is idle or not. FIG. 6 shows IEEE 802.15.4 CSMA transmission process. An IEEE 802.15.4 device receives data transmission request at time T1, it then performs a random delay until time T2. At time T2, the device performs CCA operation to determine if channel is idle. If channel is idle, the device transmits data at time T2. If Chanel is busy, the device performs another random backoff delay. This is inefficient since T2–T1 amount of time is wasted if no other device is transmitting. In that case, the device can immediately transmits at time T1.

Figure 7:
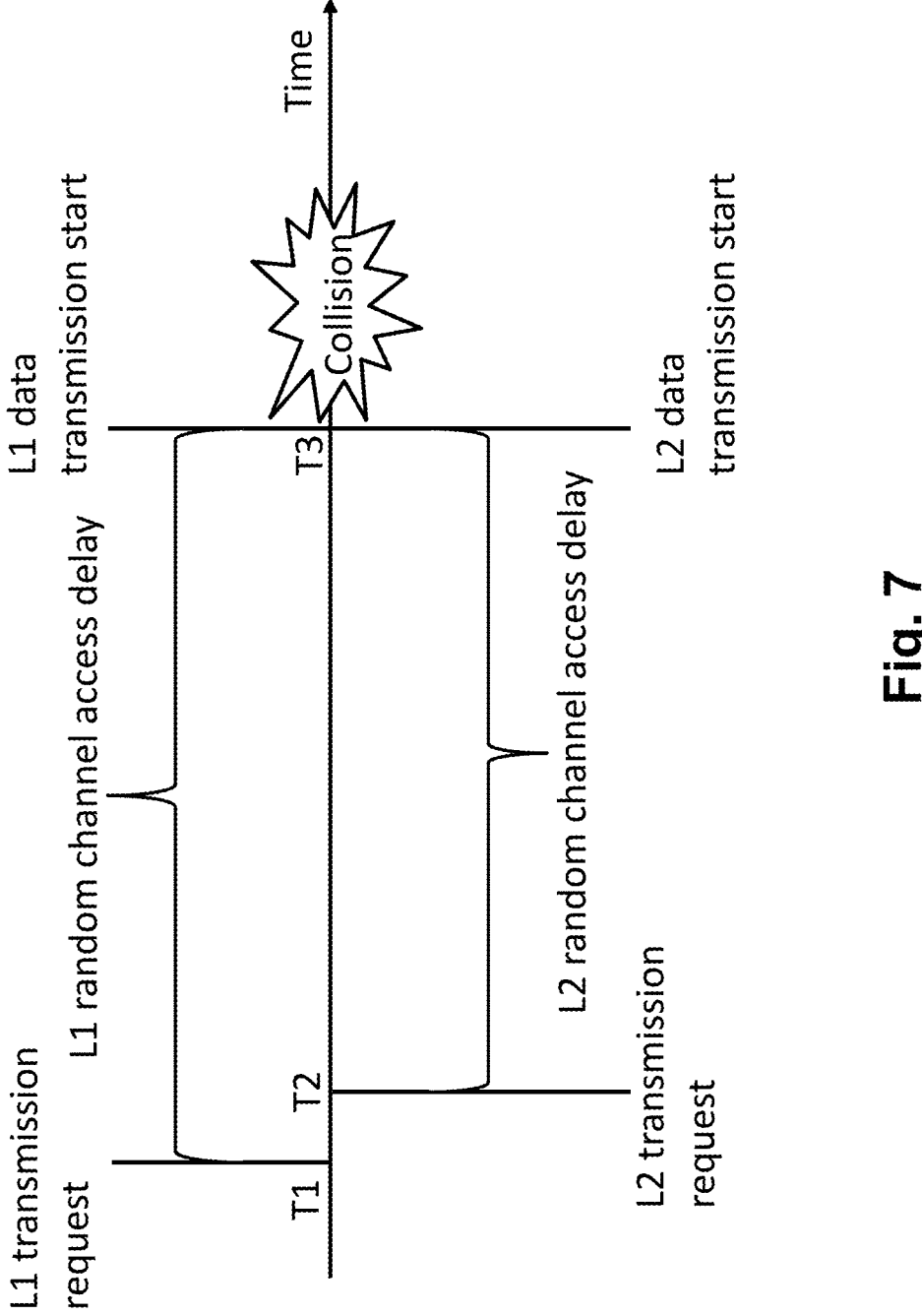
FIG. 7 shows scenario of transmission collision caused by two interfering routing links.

FIG. 7 depicts transmission collision caused by two interfering link L1 and L2, in which L1 receives transmission request at time T1 and starts random backoff delay until to time T3. On the other hand, link L2 receives transmission request at time T2 and starts random backoff delay also until to time T3. At time T3, both L1 and L2 perform CCA operation and determine idle channel. As a result, they start transmissions at time T3 and their transmissions collide.

Figure 8:
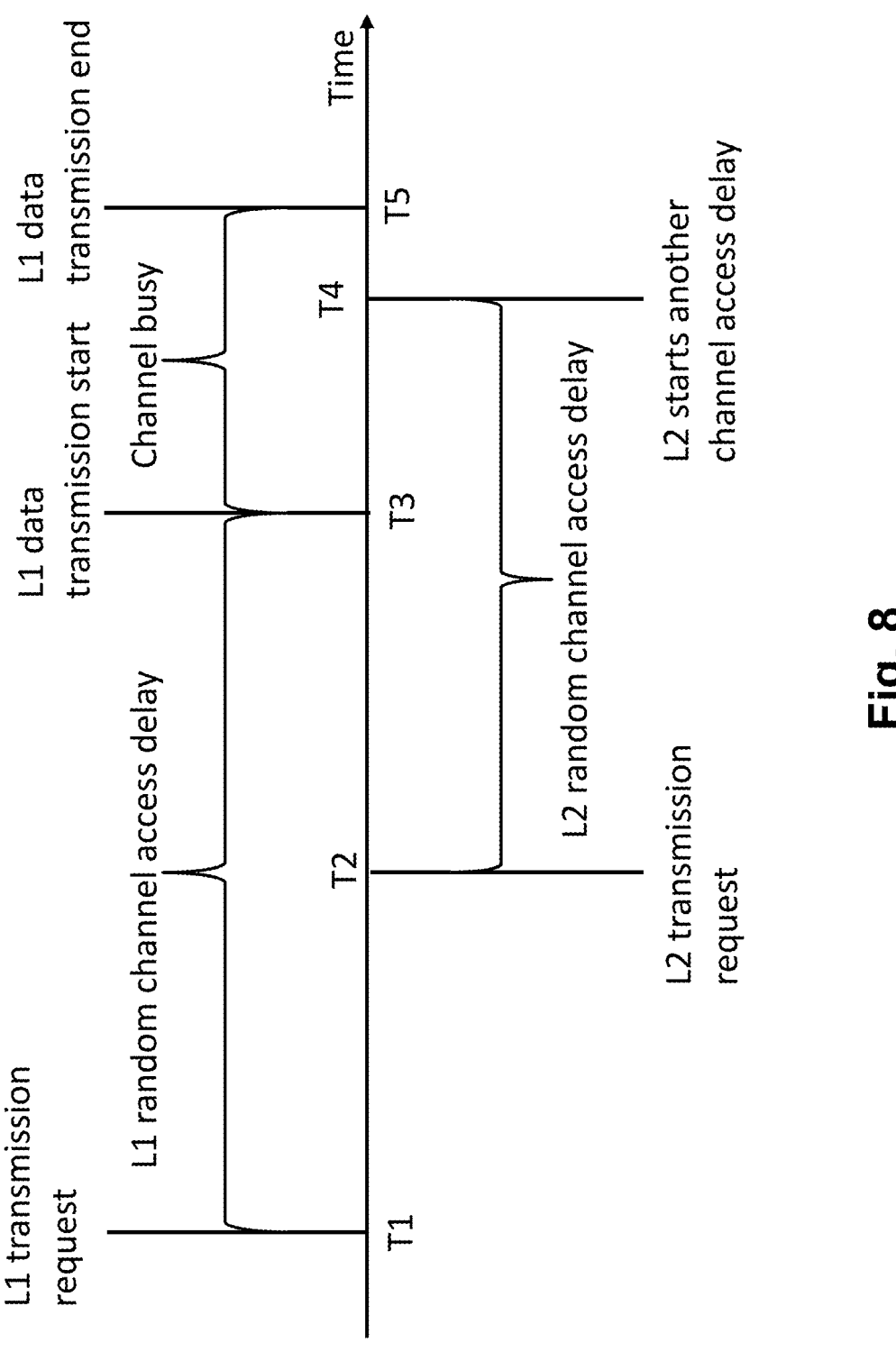
FIG. 8 shows channel access delay caused by the CSMA based channel access mechanism.

FIG. 8 depicts transmission delay caused by two interfering link L1 and L2, in which L1 receives transmission request at time T1 and starts random backoff delay until to time T3. On the other hand, link L2 receives transmission request at time T2 and starts random backoff delay until to time T4. At time T3, L1 performs CCA operation and determine idle channel. As a result, link L1 start transmission at time T3 until to time T5. Meanwhile L2 performs CCA operation at time T4 and however, L1 is transmitting at this time. As a result, L2 starts another random backoff delay. Had L1 started transmission at time T1, it would finish transmission before time T2. As a result, L2 could start transmission at time T2.

Denote as $\mathcal{L} = \{L_1, L_2, \ldots, L_N\}$ the set of $\varepsilon_1$ and $\varepsilon_2$ links that are on routes $R_1, R_2, \ldots, R_{NoR}$. The link capacity, i.e., channel capacity, for link $L_i$ is denoted as $C_i$ (i=1, 2, ..., N). The vector $q \in \{0,1\}^{N \times 1}$ indicates if the starting nodes of links in $\mathcal{L}$ have data to transmit with $q_i=1$ indicating yes and $q_i=0$ indicating no. The goal is to determine a scheduling policy vector $p \in \{0,1\}^{N \times 1}$ with $p_i=1$ indicating link $L_i$ scheduled to transmit and $p_i=0$ indicating otherwise.

The routing link scheduling problem in heterogeneous wireless IoT networks can be formulated as an optimization problem. More specifically, the routing link scheduling problem for the network illustrated in FIG. 1 is formulated as following optimization problem $$p(\mathcal{L}, x) = \underset{p}{\operatorname{argmax}} \sum_{i=1}^{N} p_i x_i \tag{1}$$

$$\text{s.t. } L_i \cap L_j = \emptyset, \forall L_i \& L_j \in \varepsilon_1, p_i = p_j = 1, 1 \le i, j \le N, i \ne j \tag{2}$$

$$x_i \le \mathbb{E}_H[C_i], \forall p_i = 1 \tag{3}$$

$$p_i \in \{0, 1\}, 1 \le i \le N \tag{4}$$

$$p_i = 1 \text{ only if } q_i = 1, 1 \le i \le N \tag{5}$$

where condition (2) is interference constraint such that the scheduled $\varepsilon_1$ links do not interfere with each other, condition (3) is link capacity constraint such that the amount of data scheduled for a link does not exceed the expected link capacity, condition (4) is scheduling decision constraint such that a link is either scheduled or not scheduled and condition (5) is data availability constraint such that a link is scheduled only if the starting node of the link has data to transmit. For the link capacity constraint, the expected capacity is used to take dynamic channel conditions into account. The expected link capacity can be dynamically estimated using a wireless channel model.

Link Scheduling Policy Parameterization for Heterogeneous Graph Neural Network

Directly solving optimization (1) can be intractable due to the discrete policy variables in vector p and constraints. To tackle the challenge, the scheduling policy $p(\mathcal{L}, x)$ is parameterized with a mapping function $\Psi(w, \mathcal{L}, x)$, where the parameter set w is of controllable dimension. Accordingly, the optimization problem (1) can be rewritten as $$\Psi(w, \mathcal{L}, x) = \underset{w}{\mathrm{argmax}} \sum_{i=1}^{N} \Psi_i(w) x_i \tag{6}$$

$$\text{s.t. } L_i \cap L_j = \emptyset, \forall L_i \ \& \ L_j \in \varepsilon_1, \Psi_i(w) = \Psi_j(w) = 1, 1 \le i, j \le N, i \ne j \tag{7}$$

$$x_i \le \mathbb{E}_H[C_i], \forall \Psi_i(w) = 1 \tag{8}$$

$$\Psi_i(w) \in \{0, 1\}, 1 \le i \le N \tag{9}$$

$$\Psi_i(w) = 1 \text{ only if } q_i = 1, 1 \le i \le N \tag{10}$$

Denote in matrix form, let $A_V:\{0,1\}^{|V| \times N}$ represent the presentation matrix of nodes involved in routing links. In the i-th column of $A_V$, the element with entry 1 indicates that this node is used in link $L_i$ as either the starting node or the ending node. Similarly, we can define $A_S: \{0,1\}^{|S| \times N}$ to represent the usage of single-link nodes in routing links and $A_I: \{0,1\}^{N \times N}$ to represent routing link interference matrix with the entry $[A_I]_{ij}=1$ indicating links $L_i$ and $L_j$ interfere with each other. With these notations, the optimization problem (6) can be rewritten as $$\Psi(w, \mathcal{L}, x) = \underset{w}{\mathrm{argmax}} x^T A_V \Psi(w) \tag{11}$$

$$\text{s.t. } A_S A_I \Psi(w) \le 1_{|S|} \tag{12}$$

$$x_i \le \mathbb{E}_H[C_i], \forall \Psi_i(w) = 1 \tag{13}$$

$$\Psi_i(w) \in \{0, 1\}, 1 \le i \le N \tag{14}$$

$$\Psi_i(w) = 1 \text{ only if } q_i = 1, 1 \le i \le N \tag{15}$$

Routing link scheduling problem (11) is usually a non-convex combinatorial problem, which is generally NP-hard and difficult to get the optimal solution. Traditional methods to solve this problem are mainly based on mathematical optimization techniques with high computation complexity. To overcome the high computational complexity, machine leaning based approaches have been introduced recently, e.g., the GNN techniques have been employed in link prediction, node classification and graph regression.

The system model shown in FIG. 1 can be represented as a heterogeneous graph since there are different types of nodes and edges. Therefore, the heterogeneous graph neural network (HetGNN) based techniques are provided for optimization problem (11). The node features include node type (single-link or multi-link), amount of data, neighbors (single-link neighbors and multi-link neighbors), its involvement in routing links (number of links involved, starting node or ending node of links), etc. The edge features include edge type ($\varepsilon_1$ or $\varepsilon_2$), edge capacity, node pair, edge usability in routing, edge direction in routing, interference edges, etc. The given routes $R_1, R_2, \ldots, R_{NoR}$ can be considered as meta-paths in graph neural network.

For a node $k \in V$, its neighbor set is denoted as N(k). The node embedding is defined as $$h_k^V = \sigma\left(f_k + \sum_{\substack{u \in N(k) \\ e=(u,k)}} \left(w_{E_1} \mathbb{1}(e \in \varepsilon_1) + w_{E_2} \mathbb{1}(e \in \varepsilon_2)\right) h_e^\varepsilon\right), \tag{16}$$

where $f_k$ is the feature vector of node k, $w_{E_1}$ is the parameter set for $\varepsilon_1$ edges, $w_{E_2}$ is the parameter set for $\varepsilon_2$ edges, $$h_e^\varepsilon$$

takes account of the routing involvement of edge e and $\sigma$ is node activation function such as the rectified linear unit (ReLU).

For an edge $e=(u,k) \in \varepsilon$, the edge embedding is defined as $$h_e^\varepsilon = \sigma_e\left(h_u^V + h_k^V\right), \tag{17}$$

where $$h_u^V$$

and $$h_k^V$$

are embedded feature vectors of nodes connected by edge e and $\sigma_e$ is edge activation function.

Accordingly, for a route $R \in \mathcal{R}$, the meta-path embedding is defined as $$h_R^{\mathcal{R}} = \sigma_m\left(h_{R(1)}^V, h_{(R(1),R(2))}^\varepsilon, \ldots, h_{(R(|R|-1,R(|R|))}^\varepsilon, h_{R(|R|)}^V\right), \tag{18}$$

where $\sigma_m$ is meta-path activation function.

Primal-Dual Algorithm for Unsupervised Training

The problem (11) belongs to a combinatorial optimization problem, which is generally NP-Hard. The primal-dual method is a standard approach in the design of algorithms for combinatorial optimization problems. Accordingly, the primal-dual method is applied to solve the problem (11). The primal problem is $$P = \max_w x^T A_V \Psi(w) \tag{19}$$

$$\text{s.t. } A_S A_I \Psi(w) \le 1_{|S|} \tag{20}$$

$$x_i \le \mathbb{E}_H[C_i], \forall \Psi_i(w) = 1 \tag{21}$$

-continued $$\Psi_i(w) \in \{0, 1\}, 1 \le i \le N \tag{22}$$

$$\Psi_i(w) = 1 \text{ only if } q_i = 1, 1 \le i \le N \tag{23}$$

The Lagrangian form of primal problem (19) is defined by associating Lagrange multipliers $\mu$ with the capacity constraint and $\lambda$ with the interference constraint, i.e., the Lagrangian problem can be written as $$L[w, \Lambda] = x^T A_V \Psi(w) + \sum_{i=1}^N \mu_i \Psi_i(w)(x_i - \mathbb{E}_H[C_i]) + \lambda^T (A_S A_I \Psi(w) - \mathbb{1}_{|S|}) \tag{24}$$

The dual function is obtained by maximizing the Lagrangian over the primal variables as $$g[\Lambda] = \max_{w, \Psi_i(w) \in \{0,1\}} L[w, \Lambda] \tag{25}$$

As a result, the dual problem is defined as $$D = \min_{\Lambda \ge 0} g[\Lambda] \tag{26}$$

The primal problem is non-convex, which implies that the duality gap can be non-zero, i.e. D≥P. Therefore, this is called a duality relaxation on the primal problem.

For some problems, the duality gap is zero. For routing link scheduling problems, when the channel between each pair of nodes is deterministic, the problem is known to be NP-hard. Introducing fading channels can vanish the duality gap, i.e. P=D. More specifically, the following theorem states that Theorem 1 If the channel cumulative distribution function (cdf) is continuous, then P=D.

Assuming the optimal set of dual variables $\Lambda^*$ is available, the primal updates can be formulated as $$w(t + 1) = w(t) + \epsilon_t \nabla_w \Psi(w)(A_V^T x + A_I^T A_S^T \lambda(t)) \tag{27}$$

and the dual updates can be formulated as $$\mu_i(t + 1) = [\mu_i(t) - \epsilon_t \Psi_i(w(t))(x_i - \mathbb{E}_H[C_i])]^+, \tag{28}$$

$$\lambda(t + 1) = [\lambda(t) - \epsilon_t (A_S A_I \Psi((t)) - \mathbb{1}_{|S|})]^+, \tag{29}$$

where $[\cdot]^+$ denotes component wise maximum between 0 and the value inside the square brackets, while Et is a properly selected step size.

It is noticed that update (28) cannot be computed without explicit knowledge of fading channel distribution H and data distribution x. The is solved by sampling a realization H(t) and updating according to:

$$\mu_i(t + 1) = [\mu_i(t) - \epsilon_t \Psi_i(w(t))(x_i - C_i(H(t)))]^+, \tag{30}$$

which enables the use of the observed capacity $C_i(H(t))$ directly without the need to know the explicit fading channel condition.

An unsupervised heterogeneous graph neural network (HetGNN) training algorithm is provided in FIG. 9, in which data node set $V = S \cup \mathcal{M}$, network topology indicating a number of data centers and locations of data nodes and data centers and route set $\mathcal{R}$ are given. Using given routes, at least one data center sends neighbor discovery request to all data nodes to perform neighbor discovery. Upon receiving neighbor discovery request, each data node discovers neighbors by using a method such as probe and response via at least one communication interface. Upon completion of neighbor discovery, all data nodes send neighbor sets to the requesting data center along the routes from which they received the neighbor discovery request. Upon receiving the neighbor sets, at least one data center configures routing link set $\mathcal{L}$ using route set $\mathcal{R}$ and constructs interference links for each routing link using neighbor sets and node location. At least one data center then performs recursive training process by updating primal and dual variables (primal-dual variables) to learn scheduling policies for each time slot. Once training process completes, at least one data center transmits the learned scheduling policies to all data nodes using the given route set $\mathcal{R}$, where scheduling policies are relayed hop-by-hop along the routes by using at least one transceiver arranged in each of the data centers and each of data nodes.

Figure 10:
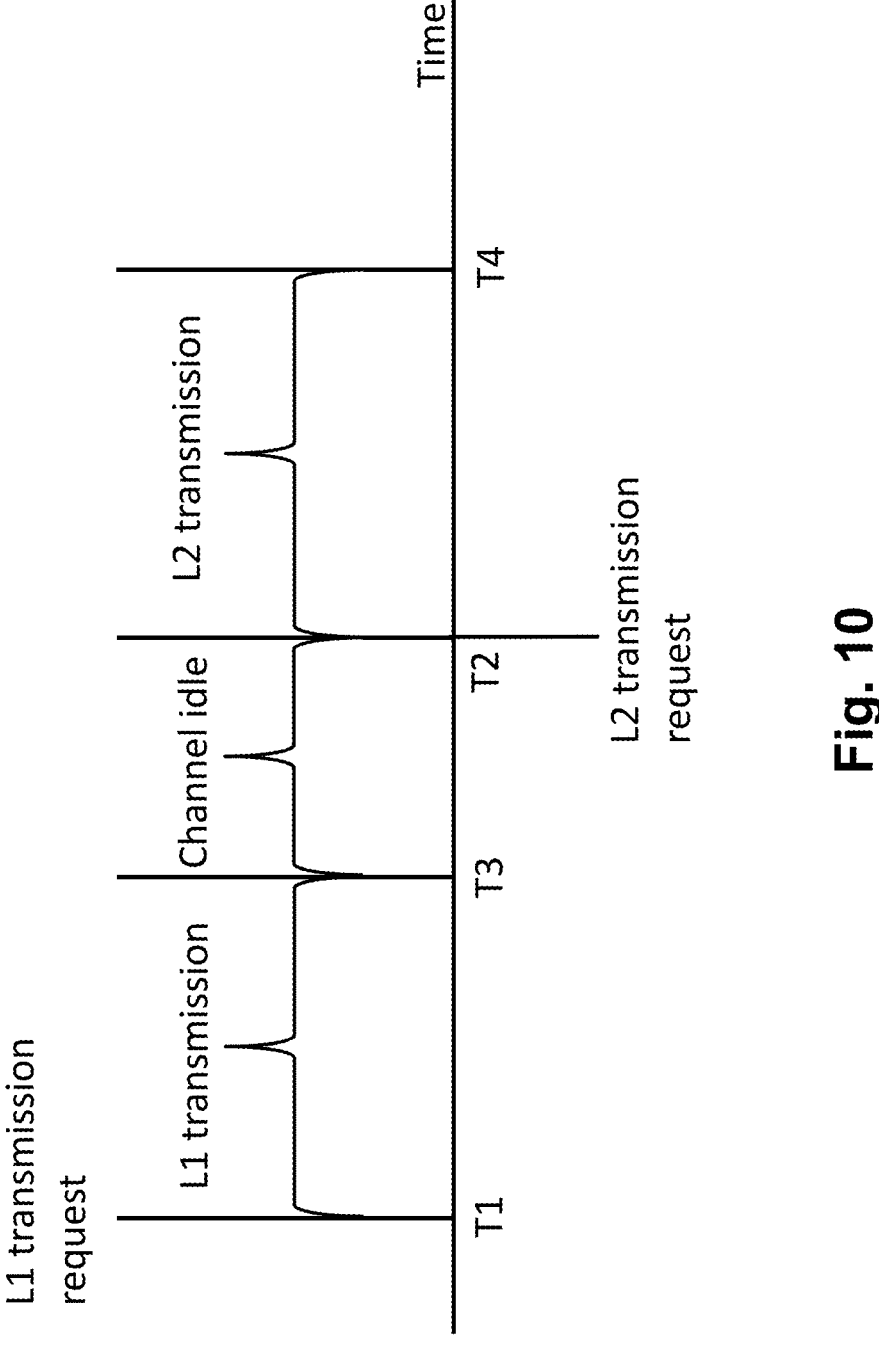
FIG. 10 demonstrates non-delay non-interfering transmissions scheduled by the HetGGN algorithm, according to some embodiments of the present invention.

FIG. 10 depicts efficient data transmission using routing link scheduling method for same traffic scenario and two interfering link L1 and L2 shown in FIG. 8, in which L1 receives transmission request at time T1 and starts transmission at time T1 without random delay since channel is idle. At time T3, L1 finishes transmission. On the other hand, link L2 receives transmission request at time T2 and starts transmission at time T2 since channel is idle. Instead of performing another random delay at time T4 as shown in FIG. 8, L2 finishes transmission at time T4. No delay incurred for both links.

Figure 11:
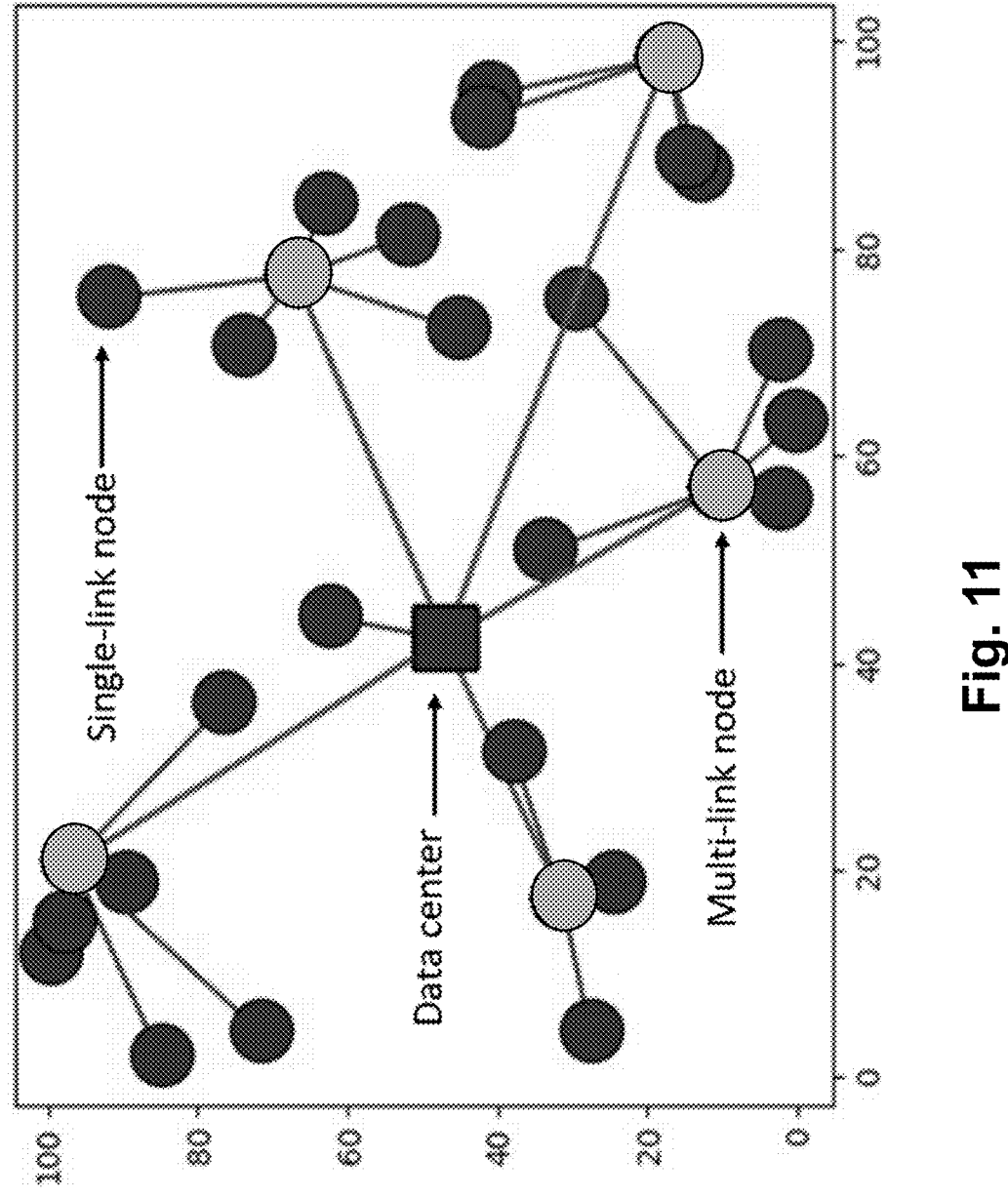
FIG. 11 is a random node deployment example for performance evaluation of the HetGGN algorithm, according to some embodiments of the present invention.

The performance of the HetGNN algorithm is performed under different network deployment scenarios. FIG. 11 shows a node deployment scenario with 1 data center, 5 multi-link data nodes and 24 single-link data nodes, where nodes are randomly deployed in a 100 m by 100 m square. The communication range for low-speed link is set to 25 m and for high-speed link is set to 100 m. As a result, multi-link nodes can directly communicate with the data center. The routes are discovered by enhanced Dijkstra's shortest path algorithm to fit the heterogeneous networks. Three performance metrics are data throughput, link capacity violation and interference violation, where link capacity constraint is violated if the scheduled data exceeds the link capacity and interference constraint is violated if the interfering $\varepsilon_1$ links are scheduled simultaneously. The convolutional neural network (CNN) algorithm and the homogeneous GNN (HomGNN) algorithm are used as benchmarks.

Figure 12A:
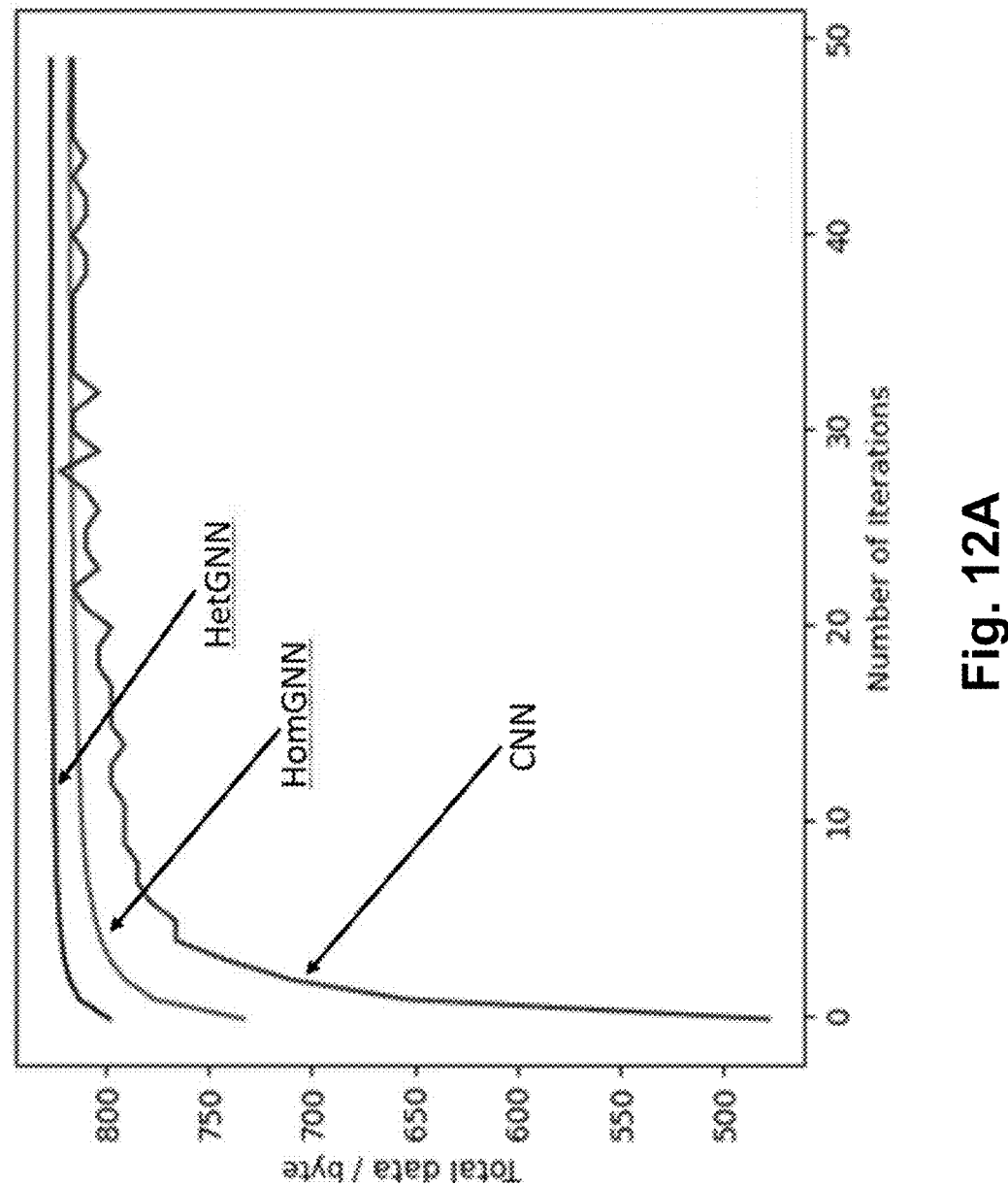
FIG. 12A demonstrates network throughput obtained by HetGGN algorithm, heterogeneous graph neural network (HomGNN) algorithm and convolutional neural network (CNN) algorithm, according to some embodiments of the present invention.

FIG. 12A shows data throughput performance, CNN algorithm delivers 807.57 bytes of data per time slot, HomGNN algorithm delivers 808.17 bytes of data per time slot, and HetGNN algorithm delivers 827.7 bytes of data per time slot. Accordingly, HetGNN improves CNN throughput by 2.5% and improves HomGNN throughput by 2.4%.

Figure 12B:
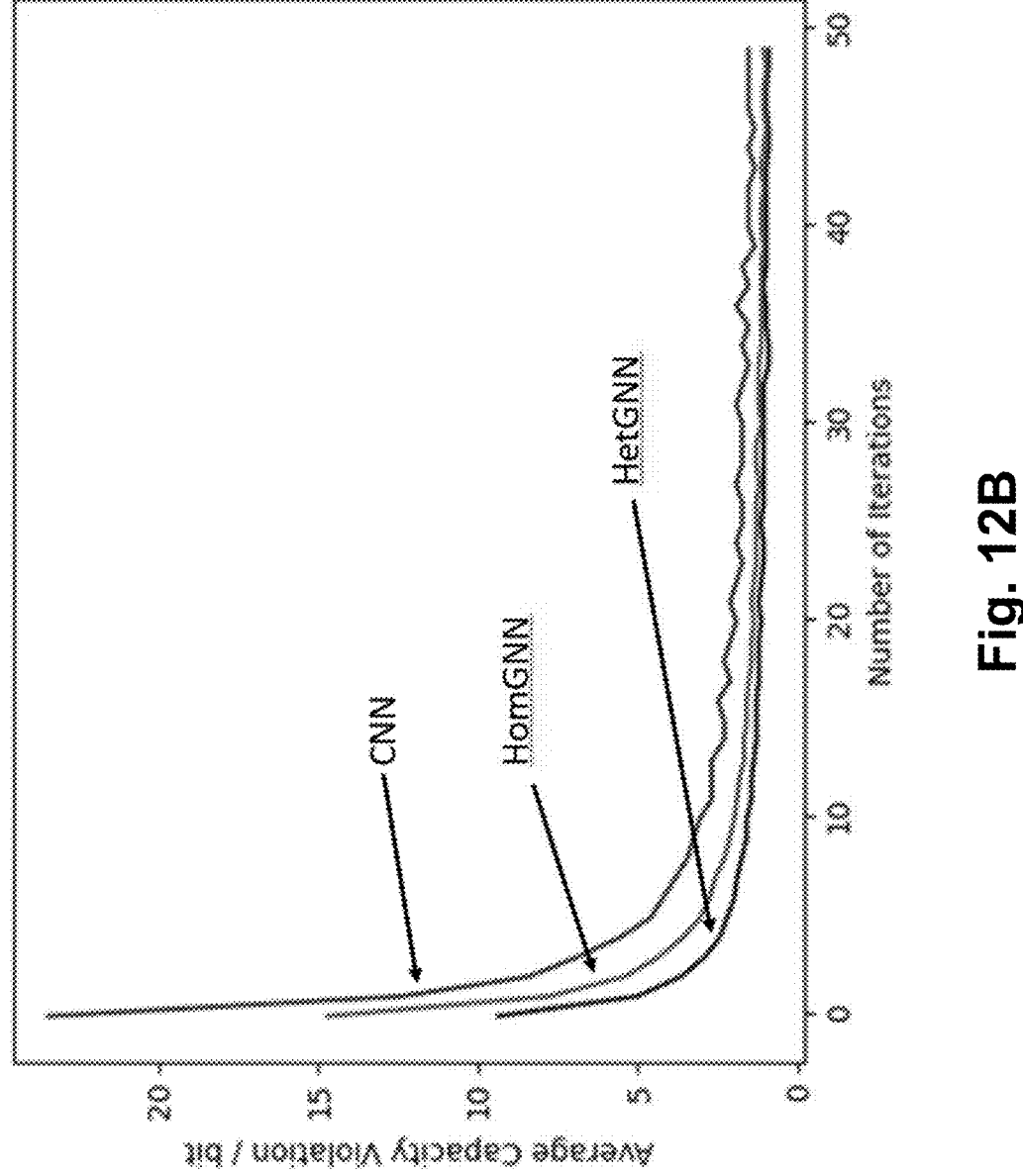
FIG. 12B shows routing link capacity violation caused by HetGGN algorithm, HomGNN algorithm and CNN algorithm, according to some embodiments of the present invention.

FIG. 12B shows average link capacity violation, CNN algorithm over schedules 1.55 bits of data per time slot, HomGNN algorithm over schedules 1.02 bits of data per time slot and HetGNN algorithm over schedules 0.82 bit of data per time slot. As a result, HetGNN improves CNN performance by 47% and improves HomGNN performance by 20%.

Figure 12C:
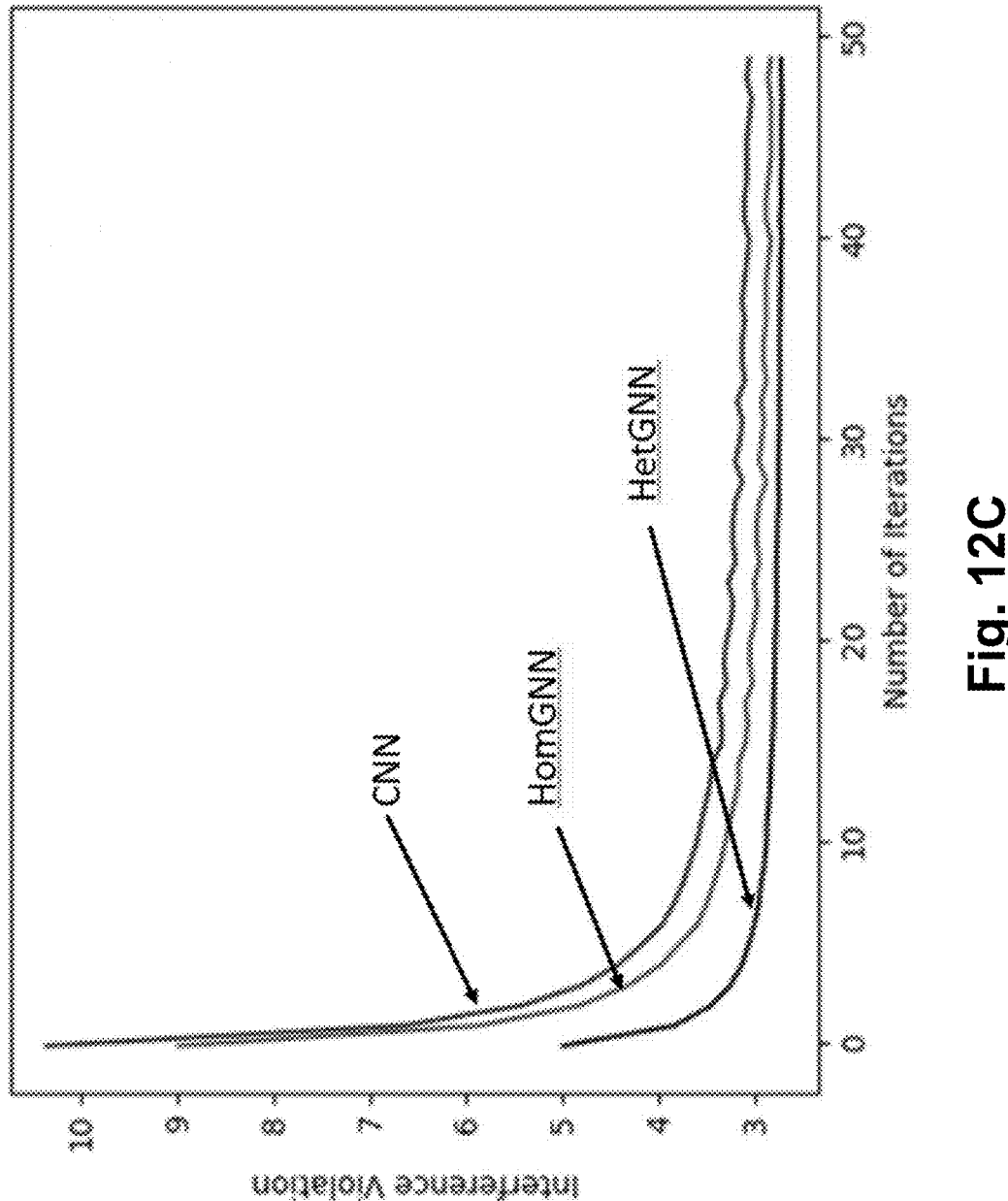
FIG. 12C illustrates routing link interference violation caused by HetGGN algorithm, HomGNN algorithm and CNN algorithm, according to some embodiments of the present invention.

FIG. 12C demonstrates average routing link interference violation, CNN algorithm violates interference constraint 3.08 times per time slot, HomGNN algorithm violates interference constraint 2.83 times per time slot and HetGNN algorithm violates interference constraint 2.75 times per time slot. Therefore, HetGNN reduces interference constraint violation over the CNN by 11% and over the HomGNN by 3%.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format. For instance, algorithm and policies described in the above may be stored in memory/storage devices as computer programs, computer implemented instructions with valuables.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A routing link scheduling method for heterogeneous wireless networks including single-link data nodes, multi-link data nodes and at least one data center having at least one transceiver, a processor in association with a memory storing computer programs, wherein the at least one data center is configured to perform steps comprising:

providing a total data node set including a single-link data node set and a multi-link data node set, a network topology of the heterogeneous wireless networks, and a route set from the total node set to the at least one data center, wherein the network topology indicates a number of data centers and locations of data nodes and data centers;

formulating a routing link scheduling problem to determine routing link scheduling policies as a combinatorial optimization problem subject to a set of constraints;

parameterizing the routing link scheduling policies by a mapping function associated with a parameter set to convert the combinatorial optimization problem to a parameterized optimization problem;

solving the parameterized optimization problem using a primal-dual method with zero duality gap; and updating primal-dual variables based on an unsupervised heterogeneous graph neural network (HetGNN) algorithm, wherein the steps of training the node features and edge features through updating the primal-dual variables continue until a time threshold; and generating the routing link scheduling policies at each step up to the time threshold for the single-link data nodes and the multi-link data nodes, respectively, based on the updated primal dual variables, wherein each of the routing link scheduling policies includes a data transmission time for a scheduled routing link such that the scheduled routing links are not interfering links.

2. The routing link scheduling method of claim 1, wherein data node set is $V=S\cup\mathcal{M}$ indexed with $k=\{1,2, \ldots, |S|, |S|+1, \ldots, |S|+|\mathcal{M}|\}$, wherein the S is single-link data node set and the $\mathcal{M}$ is multi-link data node set.

3. The routing link scheduling method of claim 1, wherein the data sets for data nodes in set V are denoted as $x=\{x_1, x_2, \ldots, x_{|S|+1}, \ldots, x_{|S|+|\mathcal{M}|}\}$, wherein the data of each data node include self-data and potential relay data in a routing process.

4. The routing link scheduling method of claim 1, wherein the edge set is denoted as $\varepsilon=\varepsilon_1\cup\varepsilon_2$, wherein $\varepsilon_2$ contains the edges between nodes belonging to multi-link node set M and data centers and $\varepsilon_1$ represents the rest of the edges.

5. The routing link scheduling method of claim 1, where at least one data center requests data nodes to perform neighbor discovery, wherein the data nodes send neighbor sets to the requesting data center.

6. The routing link scheduling method of claim 1, wherein at least one data center constructs a routing link set $\mathcal{L}=\{L_1, L_2, \ldots, L_N\}$ using the provided route set $\mathcal{R}=\{R_1, R_2, \ldots, R_{NoR}\}$, wherein the N is a number of routing links in route set $\mathcal{R}$.

7. The routing link scheduling method of claim 6, wherein a routing link is a directional edge with a starting node and an ending node, wherein the routing links are divided into $\varepsilon_1$ links and $\varepsilon_2$ links, wherein the $\varepsilon_2$ links are the links between nodes belonging to multi-link node set $\mathcal{M}$ and data centers and $\varepsilon_1$ links are the rest of the links.

8. The routing link scheduling method of claim 1, wherein the interfering links are the links that cause wireless signal collision at the at least one recipient if these links transmit data simultaneously.

9. The routing link scheduling method of claim 8, wherein the $\varepsilon_1$ links can interfere with each other, wherein the $\varepsilon_2$ links do not interfere with each other, wherein the $\varepsilon_1$ links and the $\varepsilon_2$ links do not interfere with each other.

10. The routing link scheduling method of claim 8, wherein a set of $\varepsilon_1$ links $L_1 \triangleq a_1 \rightarrow b_1$, $L_2 \triangleq a_2 \rightarrow b_2$, ..., $L_n \triangleq a_n \rightarrow b_n$ are interfering links if and only if there exists at least one $b_j$ such that $b_j$ is a neighbor of at least two $a_i$s.

11. The routing link scheduling method of claim 1, where the set of constraints for the formulated routing link scheduling problem include (1) an interference constraint such that the scheduled $\varepsilon_1$ links do not interfere with each other, (2) a link capacity constraint such that the amount of data scheduled for a link does not exceed the expected link capacity, (3) a scheduling decision constraint such that a link is either scheduled or not scheduled and (4) a data availability constraint such that a routing link is scheduled only if the starting node of the link has data to transmit.

12. The routing link scheduling method of claim 1, wherein each route in the route set $\mathcal{R}$ is denoted by a route index number, wherein each route is configured to contain a sequence of ordered nodes.

13. The routing link scheduling method of claim 1, wherein the node features include node types indicating single-links or multi-links, amount of the data set, neighbors indicating single-link neighbors and multi-link neighbors, a number of routing links involved to route the data, a starting node or an ending node of routing links.

14. The routing link scheduling method of claim 1, wherein each of the single-link data nodes is configured to communicate with neighboring single-link nodes, neighboring multi-link nodes and neighboring data centers using a low-speed communication interface, wherein each of the multi-link data nodes is configured to communicate with the neighboring single-link data nodes using the low-speed communication interface, wherein the each of the multi-link data nodes is configured to with the neighboring multi-link data nodes and neighboring data centers using a high-speed communication interface.

15. The routing link scheduling method of claim 1, wherein at least one data center sends neighbor discovery request to data nodes using the provided route set $\mathcal{R}$.

16. The routing link scheduling method of claim 15, wherein upon receiving the neighbor discovery request, each of data nodes discovers its neighbors by using a method such as probe and response via at least one communication interface.

17. The routing link scheduling method of claim 16, wherein upon completion of neighbor discovery, each of data nodes sends its neighbor set to the requesting data center along the route from which the node received neighbor discovery request.

18. The routing link scheduling method of claim 17, wherein upon receiving the neighbor sets from data nodes, at least one data center configures routing link set $\mathcal{L}$ using route set $\mathcal{R}$ and constructs interference links for each routing link in set $\mathcal{L}$ using neighbor sets and node location.

19. The routing link scheduling method of claim 1, wherein at least one data center performs recursive training process by updating primal and dual variables in formulated routing link scheduling problem to learn scheduling policies for each time slot.

20. The routing link scheduling method of claim 19, wherein at least one data center transmits the learned scheduling policies to data nodes using the provided route set $\mathcal{R}$.

21. The routing link scheduling method of claim 1, wherein each of data nodes transmit data along the given routing link to next hop node at the scheduled time slot based on the received scheduling policy.

22. A data center for performing a routing link scheduling for heterogeneous wireless networks including single-link data nodes, multi-link data nodes, and at least another data center, comprising:

at least one transceiver configured to perform data communications with the single-link data nodes, the multi-link data nodes;

a processor; and a memory comprising instructions stored thereon, that when executed on the processor, perform the steps of:

providing a total data node set including a single-link data node set and a multi-link data node set, a network topology of the heterogeneous wireless networks, and a route set from the total node set to the at least one data center, wherein the network topology indicates a number of data centers and locations of data nodes and data centers;

formulating a routing link scheduling problem to determine routing link scheduling policies as a combinatorial optimization problem subject to a set of constraints;

parameterizing the routing link scheduling policies by a mapping function associated with a parameter set to convert the combinatorial optimization problem to a parameterized optimization problem;

solving the parametrized optimization problem using a primal-dual method with zero duality gap; and updating primal-dual variables based on an unsupervised heterogeneous graph neural network (HetGNN) algorithm, wherein the steps of training the node features and edge features through updating the primal-dual variables continue until a time threshold; and generating the routing link scheduling policies at each step up to the time threshold for the single-link data nodes and the multi-link data nodes, respectively, based on the updated primal dual variables, wherein each of the routing link scheduling policies includes a data transmission time for a scheduled routing link such that the scheduled routing links are not interfering links.

* * * * *